(12) United States Patent
Nakamura

(10) Patent No.: US 10,331,237 B2
(45) Date of Patent: Jun. 25, 2019

(54) CONDUCTIVE FILM AND TOUCH PANEL SENSOR PROVIDED WITH SAME

(71) Applicant: FUJIFILM Corporation, Tokyo (JP)

(72) Inventor: Hiroshige Nakamura, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 239 days.

(21) Appl. No.: 15/498,973

(22) Filed: Apr. 27, 2017

(65) Prior Publication Data

US 2017/0228052 A1   Aug. 10, 2017

Related U.S. Application Data

(63) Continuation of application No. PCT/JP2015/074826, filed on Sep. 1, 2015.

(30) Foreign Application Priority Data

Nov. 27, 2014   (JP) ................................ 2014-240369

(51) Int. Cl.
  *G06F 3/044*   (2006.01)
  *G06F 3/0354*   (2013.01)

(52) U.S. Cl.
  CPC .......... *G06F 3/03545* (2013.01); *G06F 3/044* (2013.01); *G06F 2203/04112* (2013.01)

(58) Field of Classification Search
  CPC ................. G06F 3/03545; G06F 3/044; G06F 2203/04112
  See application file for complete search history.

(56) References Cited

U.S. PATENT DOCUMENTS

2014/0225839 A1* 8/2014 Dunphy ................ G06F 3/0412
                                                                  345/173

FOREIGN PATENT DOCUMENTS

| JP | 2012-94115 A | 5/2012 |
| JP | 2013-69261 A | 4/2013 |

OTHER PUBLICATIONS

International Search Report (PCT/ISA/210), issued in PCT/JP2015/074826, dated Nov. 24, 2015.
Written Opinion of the International Searching Authority (PCT/ISA/237), issued in PCT/JP2015/074826, dated Nov. 24, 2015.
(Continued)

*Primary Examiner* — Charles V Hicks
(74) *Attorney, Agent, or Firm* — Birch, Stewart, Kolasch & Birch, LLP

(57) ABSTRACT

A conductive film is configured such that a plurality of first cells constituted by thin metal wires crossing each edge line on both sides of a preset electrode shape of a conduction electrode extending in one direction have a disconnection portion at a position where the thin metal wires and the edge lines cross one another with the exception of a plurality of third cells in a closed state of which the number proportion is 50% or more of a plurality of second cells in which all apexes constituting a cell on an inner side of an extended edge line separated by a fixed distance from the edge line to an outer side, and the apexes of the plurality of third cells present between the adjacent edge line and extended edge line are end points, or the thin metal wires extending from the apex directly to the extended edge line have a disconnection portion.

20 Claims, 7 Drawing Sheets

(56) References Cited

OTHER PUBLICATIONS

International Preliminary Report on Patentability and English translation of the Written Opinion of the International Searching Authority (Forms PCT/IB/373 and PCT/ISA/237) for International Application No. PCT/JP2015/074826, dated May 30, 2017.

\* cited by examiner

CONDUCTIVE FILM AND TOUCH PANEL SENSOR PROVIDED WITH SAME

CROSS-REFERENCE TO RELATED APPLICATIONS

This application is a Continuation of PCT International Application No. PCT/JP2015/074826 filed on Sep. 1, 2015, which claims priority under 35 U.S.C. § 119(a) to Japanese Patent Application No. 2014-240369 filed on Nov. 27, 2014. Each of the above application(s) is hereby expressly incorporated by reference, in its entirety, into the present application.

BACKGROUND OF THE INVENTION

1. Field of the Invention

The present invention relates to a conductive film and a touch panel sensor provided with the same. Specifically, the present invention relates to a conductive film in which at least one of two electrode patterns constituted by combining a plurality of cells formed of a plurality of thin metal wires is a random pattern constituted by cells with irregularity, and a touch panel sensor provided with the same.

2. Description of the Related Art

Conventionally, a touch panel sensor of an electrostatic capacitive type or the like, which formed of a conductive film including a detection electrode having a two-layer structure having a strip-like electrode pattern constituted of a transparent conductive material such as indium tin oxide (ITO), or a mesh-like electrode pattern formed of a thin metal wire of silver, copper, or the like, is used in touch panel displays or the like (for example, refer to JP2013-69261A and JP2012-94115A).

JP2013-69261A discloses an electrode substrate for a touch panel having a conductor mesh formed by a predetermined non-periodic random mesh pattern not causing moire due to interference with periodic arrangement of pixels of a display panel, a touch panel using two layers of the electrode substrates through an insulating layer, and an image display device.

In the technique disclosed in JP2013-69261A, since the conductor mesh functions as a transparent conductive film, and transparency and conductivity required for a touch panel are secured. Further, in the mesh pattern of the conductor mesh, the average value N of the number of boundary line segments extending from one branch point is $3.0 \leq N < 4.0$, and the opening regions surrounded by the same number of boundary line segments do not have the same shape and have a predetermined non-periodic pattern. Thus, moire due to interference with periodic arrangement of pixels of the display panel does not occur.

On the other hand, JP2012-94115A discloses an electrostatic capacitive type touch panel in which a plurality of sensor electrodes of an upper electrode layer are formed into a mesh shape that is formed by a lattice of conductive thin wires, the direction of the thin wire of the lattice is inclined at an angle of 30° to 60° in the arranging direction of the sensor electrodes, the width of a non-conductive strip-like boundary region formed between adjacent sensor electrodes by disconnecting and removing the mesh-like conductive thin wires of the upper electrode randomly changes in a range of 10 μm to 100 μm in the extending direction of the sensor electrodes, and the average width value is 15 μm to 70 μm.

In the technique disclosed in JP2012-94115A, it is possible to provide a touch panel capable of preventing an interference fringe and obtaining an easily visible image, having excellent responsiveness in a large area, and making multi-touch possible.

SUMMARY OF THE INVENTION

However, in the technique disclosed in JP2013-69261A, an object thereof is to suppress the occurrence of moire due to interference with periodic arrangement of pixels of the display panel. In this technique, an electrode pattern formed by connecting a plurality of unit electrodes having a quadrangular shape or a rhombic shape having a random mesh pattern in one direction at the corner portion thereof is used. Therefore, each edge line of both sides of the electrode pattern is formed by connecting edges of two sides on one side of the plurality of unit electrodes that are connected in one direction, and the width of the electrode pattern changes such that the width is narrow at the connection portion of adjacent unit electrodes and is wide at the center of the unit electrode.

However, in JP2013-69261A, the setting of the edge of the unit electrode with respect to the position of the branch (intersection) of the boundary line segments constituting the opening region (cell) is not disclosed.

In addition, in the technique disclosed in JP2012-94115A, the width of a strip-like non-conductive boundary region, which is formed by removing mesh-like conductive thin wires between adjacent sensor electrodes of the upper electrode, randomly changes in the extending direction of the sensor electrode, but position setting of the boundary region with respect to the intersections of the mesh is not disclosed.

In the conductive film constituted by a thin metal wire mesh, in the case of constituting an electrode using random cells, for example, a plurality of polygonal cells having different sizes, as shown in FIGS. 10A and 10B, a disconnection portion 54 is placed in thin metal wires 40 forming cells 46 of a random wiring pattern 48 according to an edge line 52 of an electrode shape and a dummy electrode 102 is electrically separated from the conduction electrode to form a conduction electrode 100. Then, depending on the position of an intersection 58 (the apex of the polygon of the cell 46) of the thin metal wires 40 constituting the cells 46, disconnection occurs on the inner side of the intersection 58. Since the cell 46 having such an intersection 58 is an open cell 46, a problem in that a portion having high resistance is formed and variation occurs in electrode resistance values easily arises.

In addition, as disclosed in JP2013-69261A and JP2012-94115A, in the case in which the electrode width can be made wide, a predetermined number of intersections of thin metal wires in the electrode formed of the thin metal wires can be secured by widening the electrode width. Thus, even when an open cell is present, the effect of the cell can be eliminated or suppressed. However, there arises a problem of losing the degree of freedom in designing of the electrode width.

An object of the present invention is to solve the problems of the related art and to provide a conductive film capable of preventing the generation of a high resistance portion, eliminating or suppressing variation in electrode resistance values, and maintaining or improving the sensor sensitivity of a touch panel by, in an electrode formed of thin metal wires in which the number of intersections of thin metal wires determines the resistance value, providing a disconnection portion in a thin metal wire on an edge line of a preset electrode shape and in the case in which, when a preset electrode region is provided, a flexible region (extended edge line) having a predetermined width is set on the outer side of the edge line in designing, an intersection is present in the range of the flexible region, and the entire cell is included in the inner side of the extended edge line to form a closed cell, leaving the closed cell as it as by connecting the intersection to the electrode region in designing without providing a disconnection portion in the thin metal wire on the edge line, and an electrostatic capacitive type touch panel sensor provided with the same.

In order to achieve the above object, according to a first aspect of the present invention, there is provided a conductive film comprising: a transparent electrode layer having a plurality of conduction electrodes extending in one direction, in which the conduction electrode is constituted by a plurality of polygonal cells formed of thin metal wires, the plurality of polygonal cells have a random shape, the conduction electrode has a preset electrode shape extending in the one direction, the plurality of polygonal cells have a plurality of first cells formed of the thin metal wires crossing each edge line on both sides of the electrode shape, the plurality of first cells have a plurality of second cells in which all apexes of the polygonal cells formed by intersections of the thin metal wires constituting one cell are included on an inner side of an extended edge line separated by a fixed distance from the edge line to an outer side and at least one apex of all of the apexes is included between the edge line and the extended edge line adjacent to each other, a disconnection portion is provided at a position where the thin metal wires constituting the first cells and the second cells and the edge lines cross one another with the exception of the thin metal wires constituting a plurality of third cells in a closed state of which a number proportion is 50% or more of the plurality of second cells, each apex of the plurality of third cells present between the edge line and the extended edge line adjacent to each other is connected to the thin metal wire that extends toward the extended edge line and have a disconnection portion in the middle thereof, is connected to the thin metal wire connected to an apex of another third cell, or is an end point, and in a case in which a diameter of a circle having a smallest size in which the adjacent polygonal cells are included is defined as a mesh size, the fixed distance is a distance of 7% to 20% of the mesh size.

Here, it is preferable that the conductive film further comprises a substrate which is a transparent insulator, and a first transparent electrode layer including a first electrode and a second transparent electrode layer including a second electrode which are arranged on the substrate, in which at least one of the first electrode or the second electrode is the conduction electrode.

It is preferable that an electrode width of the first electrode is smaller than an electrode width of the second electrode.

It is preferable that the first electrode is the conduction electrode, the second electrode is constituted by a plurality of polygonal cells with a random shape formed of the thin metal wires and has the preset electrode shape extending in a perpendicular direction perpendicular to the one direction, and the thin metal wire constituting the cell on edge lines on both sides of the electrode shape has a disconnection portion at intersections with the edge lines.

It is preferable that the first electrode is arranged on one side of the substrate, and the second electrode is arranged on the other side of the substrate.

It is preferable that the first electrode and the second electrode are respectively formed on both surfaces of the substrate.

It is preferable that the conductive film further comprises a second substrate which is different from the substrate and is a transparent insulator, in which the first electrode is formed on one surface of the substrate, and the second electrode is formed on one surface of the second substrate and is arranged on the other surface of the substrate.

It is preferable that the first electrode and the second electrode are respectively formed on one side of the substrate through an insulating layer.

It is preferable that the thin metal wire constituting the polygonal cell on the edge line, with the exception of the thin metal wire constituting the polygonal cell that the intersection of the thin metal wire constituting the apex of the polygonal cell is in a range of 20 μm from the edge line to the outer side, has a disconnection portion at the intersection crossing with the edge line.

It is preferable that the certain distance between the edge line and the extended edge line is 20 μm to 120 μm.

It is preferable that the transparent electrode layer further has, in addition to the conduction electrode, a dummy electrode which is constituted by the plurality of polygonal cells with a random shape formed of the thin metal wires, has a preset electrode shape extending in the one direction, and is electrically insulated from the conduction electrode by the disconnection portion.

It is preferable that the transparent electrode layer alternately includes a plurality of the conduction electrodes and a plurality of the dummy electrodes, the conduction electrode includes at least a non-conduction portion which is electrically separated from conduction electrode therein, and an area A of the conduction electrode and an area B of the non-conduction portion satisfy the following expression.

$$5\% < (B/(A+B)) \times 100 < 97\%$$

In addition, it is more preferable that the area A of the conduction electrode and the area B of the non-conduction portion satisfy the following expression.

$$10\% \leq (B/(A+B)) \times 100 \leq 80\%$$

In addition, it is still more preferable that the area A of the conduction electrode and the area B of the non-conduction portion satisfy the following expression.

$$10\% \leq (B/(A+B)) \times 100 \leq 60\%$$

It is preferable that the non-conduction portion is formed into a slit-like shape extending in a first direction, the conduction electrode has a plurality of auxiliary conduction electrode columns divided by the non-conduction portion, and an area A1 of the plurality of auxiliary conduction electrode arrays and an area B1 of the non-conduction portion satisfy the following expression.

$$40\% \leq (B1/(A1+B1)) \times 100 \leq 60\%$$

It is preferable that a total width Wa of widths of the plurality of auxiliary conduction electrode columns, and a total Wb of widths of all of the non-conduction portions which divides the conduction electrode and a width of the dummy electrode satisfy the following expression.

$$Wa \leq (Wa+Wb)/2$$

It is preferable that the total width Wa of widths of the plurality of auxiliary conduction electrode columns, and the total Wb of widths of all of the non-conduction portions which divides the conduction electrode and the width of the dummy electrode satisfy the following expression.

$$1.0 \text{ mm} \leq Wa \leq 5.0 \text{ mm}$$

$$1.5 \text{ mm} \leq Wb \leq 5.0 \text{ mm}$$

It is preferable that when a regression line at a center of two connection lines formed by respectively connecting each one side of points on the inner side of all of the disconnection portions present on both side of the preset electrode shape is set to an approximate center line, each connection line is considered as straight lines having a line width of a fixed distance, and each connection line, having a length five time or more the mesh size respectively, is classified into at least one of one or more parallel line segment regions parallel with the approximate center line or one or more inclined line segment regions inclined to the approximate center line, the edge line on one side of the preset electrode shape is at least one of, a parallel line segment which is formed using points on the inner side of two or more disconnection portions in the parallel line segment region on a center side from a regression line of the points on the inner side of all of the disconnection portions constituting the connection line in the parallel line segment region, and parallel with the approximate center line in the parallel line segment region, or an inclined line segment which is formed using points on the inner side of two or more disconnection portions in the inclined line segment region on a center side from a regression line of points on the inner side of all of the disconnection portions constituting the connection line in the inclined line segment region and inclined to the approximate center line at the same angle in the inclined line segment region, on the connection line of the one side.

It is preferable that the first electrode is arranged to be closer to a viewing side than the second electrode.

In addition, in order to achieve the above object, according to a second aspect of the present invention, there is provided a touch panel sensor using the conductive film according to the first aspect.

It is preferable that the touch panel sensor further comprises a detection control portion which detects a touch position or an approach position from the surface side of the conductive film distant from the substrate on which the transparent electrode layer of the conductive film is arranged.

Here, it is preferable that the first electrode is arranged to be closer to the surface side of the conductive film distant from the substrate than the second electrode.

In addition, it is preferable that the touch panel sensor is operated using a stylus pen.

As described above, according to the present invention, it is possible to prevent the generation of a high resistance portion, eliminate or suppress variation in electrode resistance values, and maintaining or improving the sensor sensitivity of a touch panel by, in an electrode formed of thin metal wires in which the number of intersections of thin metal wires constituting a closed cell determines the resistance value, providing a disconnection portion in the thin metal wire on an edge line of an electrode shape preset (in designing), and in the case in which, when an electrode area (region) preset (in designing) is provided, an extended edge line is set on the outer side of the edge line in designing, a flexible area (region) having a predetermined width is set, an intersection is present in the range of the area the entire cell is included in the inner side of the extended edge line to form a closed cell, leaving the close cell as it is by connecting the intersection to the electrode area in designing without providing a disconnection portion in the thin metal wire on the edge line.

DESCRIPTION OF THE PREFERRED EMBODIMENTS

Hereinafter, preferable embodiments of a conductive film according to the present invention and a touch panel sensor provided with the same will be described in detail with reference to the attached drawings.

In the following description, a conductive film for a touch panel sensor will be described as a representative example of the conductive film according to the present invention. However, the present invention is not limited to this example. Any conductive film may be used as long as the conductive film is a conductive film in which at least one of both electrode patterns of first electrode and second electrode to be arranged on both sides of a substrate which is a transparent insulator (transparent insulating substrate) or to be arranged on one side thereof through an insulating layer is an electrode pattern having polygonal cells (opening portions)(also simply refer to "cells" hereinafter) with irregularity.

Examples of the conductive film according to the present invention include conductive films arranged on display panels of display devices such as liquid crystal display (LCD), plasma display panel (PDP), organic electro-luminescence (EL) diode (OLED) or organic EL display (OELD: Organic Electro-Luminescence Display) using organic electro-luminescence (organic EL) (OEL), inorganic EL (Electro-Luminescence) display, and electronic paper, and used as touch panel sensors.

(Electrostatic Capacitive Type Touch Panel Sensor)

Figure 1:
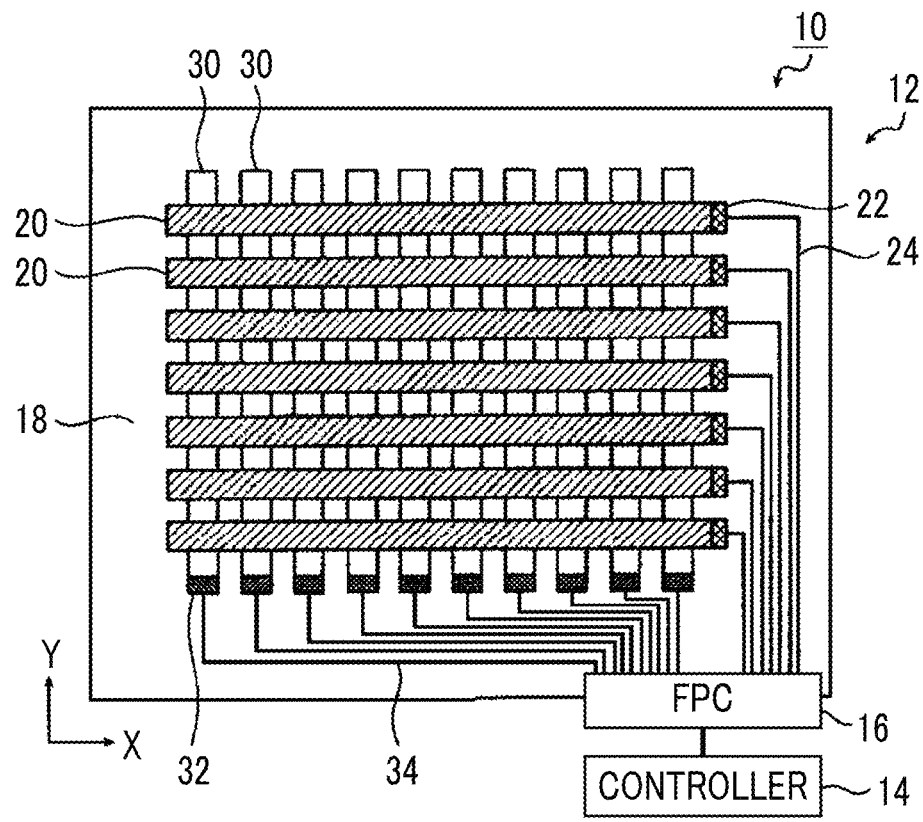
FIG. 1 is a plan view schematically showing an example of a touch panel sensor having a conductive film according to an embodiment of the present invention.
Figure 2:
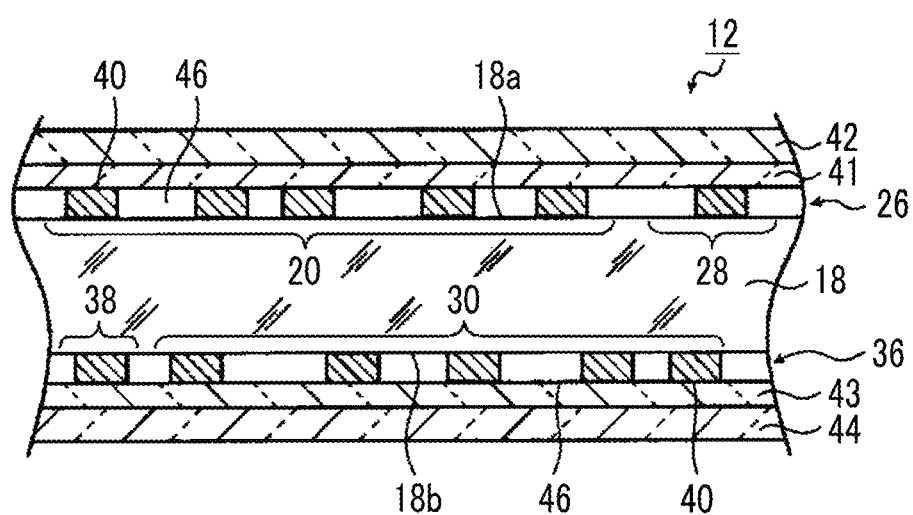
FIG. 2 a cross-sectional view schematically showing an example of the conductive film used for the touch panel sensor shown in FIG. 1.
Figure 3A:
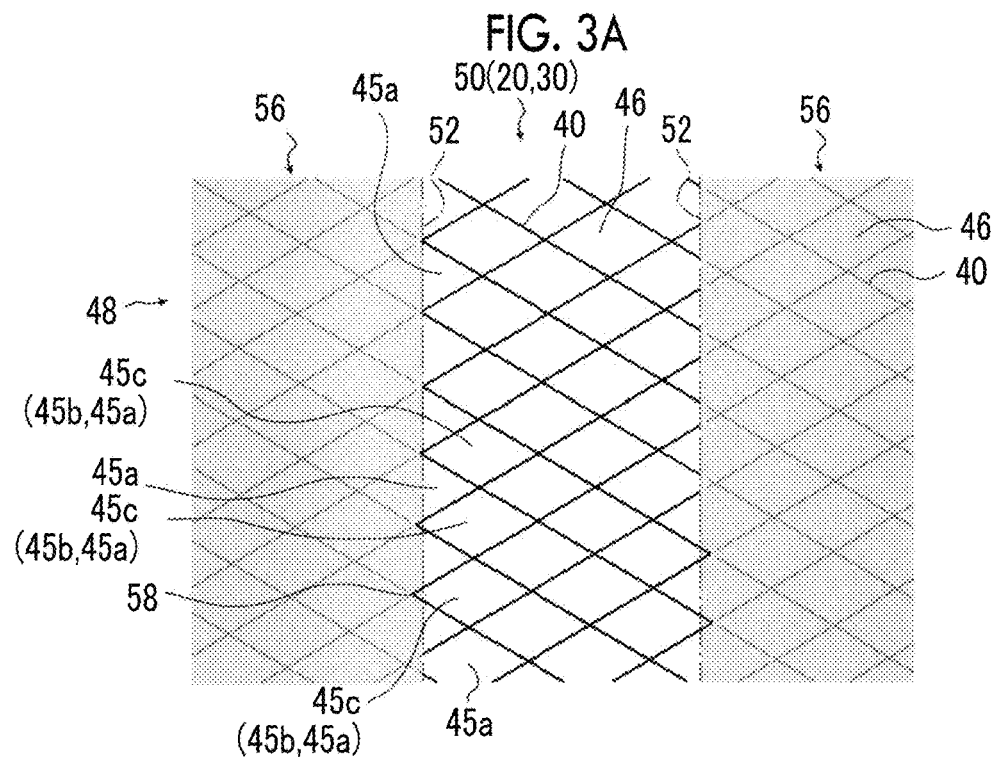
FIGS. 3A and 3B are a plan view schematically showing an example of a conduction electrode used for the conductive film shown in FIG. 1 and a partially enlarged view thereof.
Figure 3B:
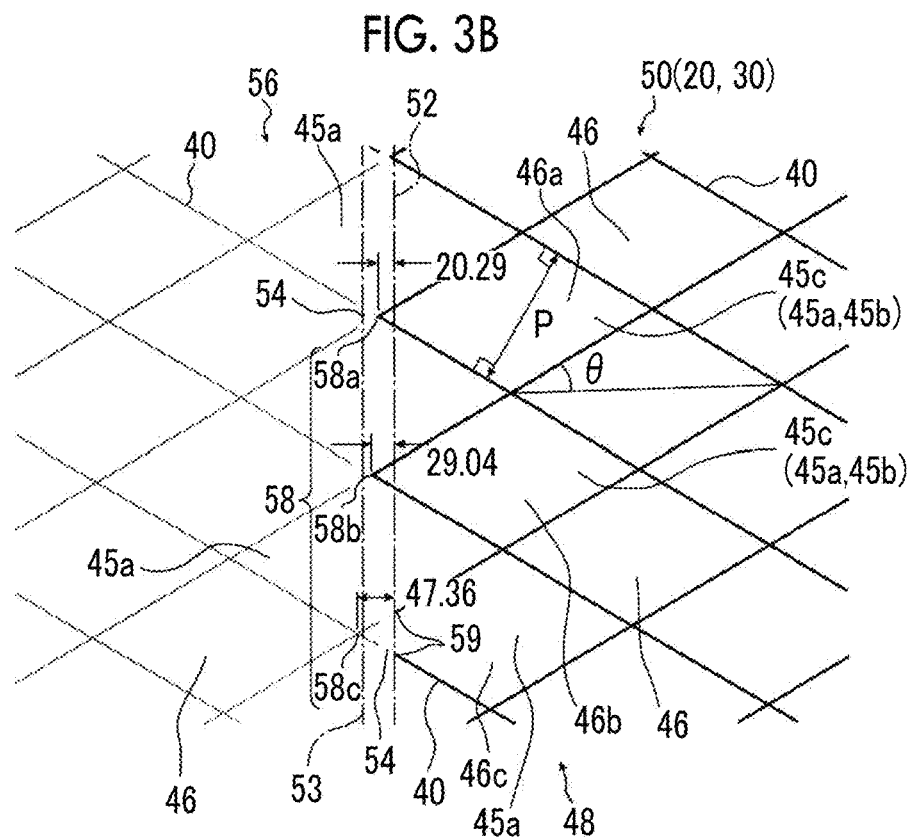

FIG. 1 is a plan view schematically showing an example of a touch panel sensor having a conductive film according to a first embodiment of the present invention, FIG. 2 is a cross-sectional view schematically showing an example of the conductive film according to the first embodiment of the present invention to be used for the touch panel sensor shown in FIG. 1, and FIGS. 3A and 3B are a plan view schematically showing an example of a random electrode pattern used for the conductive film shown in FIG. 2 and a partially enlarged view thereof.

A touch panel sensor 10 shown in FIG. 1 is arranged on the display screen of a display device (not shown) (on the side close to an operator) and is a sensor for detecting a position of an external conductor such as a human finger by utilizing a change in electrostatic capacitance that is generated when the external conductor such as a human finger touches or approaches the display device, as described above. Therefore, the touch panel sensor 10 is transparent to recognize an image to be displayed on the display panel. In addition, the display device is not particularly limited as long as a predetermined image including a moving image or the like can be displayed on the screen.

The touch panel sensor 10 of the present invention may be touched using a stylus pen, as the external conductor, instead of using a human finger or the like.

The touch panel sensor 10 includes a transparent electrode layer, a conductive film 12 of the present invention constituting a sensor portion, a controller 14, and a Flexible Printed Circuits (FPC) 16 which connects the conductive film 12 and the controller 14.

The constitution of the sensor portion in the conductive film 12 of the touch panel sensor 10 is not particularly limited, but the touch panel sensor typically has detection electrodes having a two-layer structure (for example, a plurality of first detection electrodes 20 extending in an X direction in FIG. 1 and a plurality of second detection electrodes 30 extending in a Y direction in FIG. 1) and calculates and specifies the coordinate of the position of an object such as a finger by the controller 14 formed of an IC control circuit or the like by detecting a change in electrostatic capacitance between the detection electrodes having a two-layer structure that the object such as a finger touches or approaches. The controller 14 is an external device of the conductive film 12 and constitutes a detection control portion that detects a touch position or approach position from a main surface side (operation side, viewing side) of the conductive film 12. For example, a known device used for position detection of the electrostatic capacitive type touch panel sensor can be used.

As shown in FIG. 1, on a substrate 18 of the conductive film 12, a plurality of first detection electrodes 20 (seven electrodes in the example shown in the drawing) extending in one direction (X direction in the example shown in the drawing) are arranged with intervals in a Y direction perpendicular to an X direction, while a plurality of second detection electrodes 30 (ten electrodes in the example shown in the drawing) extending in the other direction (Y direction in the example shown in the drawing) are arranged with intervals in the X direction. In this manner, the plurality of first detection electrodes 20 and the plurality of second detection electrodes 30 arranged to be perpendicular to each other form a detection region in which touch or approach (hereinafter, represented by touch) of an object such as a finger (hereinafter, represented by a finger) can be detected.

Although not shown in FIG. 1, the detection region is constituted as a transparent electrode layer formed by the plurality of first detection electrodes 20, the plurality of second detection electrodes 30, and the substrate 18 (refer to FIG. 2) interposed therebetween. The first detection electrode 20 is arranged on the surface of the substrate 18 on the viewing side and the second detection electrode 30 is arranged on the surface of the substrate 18 on the side opposite to the viewing side, that is, on the surface opposite to the surface on which the first detection electrode 20 is formed.

In the example shown in the drawing, the detection region is formed by the seven first detection electrodes 20 and the ten second detection electrodes 30. However, the number of the first detection electrodes 20 and the second detection electrodes 30 forming the detection region is not particularly limited and may be appropriately set according to required performance of detection accuracy or detection sensitivity.

In addition, although not shown in FIG. 1, from the viewpoint of suppressing the visibility of moire, it is preferable to provide a dummy electrode 28 (refer to FIG. 2) which is not electrically connected to the first detection electrode 20, between two adjacent first detection electrodes 20 provided with intervals in the Y direction. In the same manner, although not shown in FIG. 1, from the viewpoint of suppressing the visibility of moire, it is preferable to provide a dummy electrode 38 (refer to FIG. 2) which is not electrically connected to the second detection electrode 30, between two adjacent second detection electrodes 30 provided with intervals in the X direction.

In the present invention, the first detection electrode 20 and the second detection electrode 30 are electrodes not including the dummy electrode 28 and the dummy electrode 38, which are not electrically connected to these detection electrodes.

The plurality of first detection electrodes 20 each have a first terminal portion 22 at its end and are electrically connected to a plurality of first lead-out wirings 24 by the first terminal portions 22, respectively. The plurality of first lead-out wirings 24 are electrically connected to the FPC 16. The FPC 16 is electrically connected to the controller 14.

The first detection electrode 20 has a role of detecting an input position of a finger of a user approaching the detection region in the Y direction.

The plurality of second detection electrodes 30 each have a second terminal portion 32 at its end and are electrically connected to a plurality of second lead-out wirings 34 by the second terminal portions 32, respectively. The plurality of second lead-out wirings 34 are electrically connected to the FPC 16.

The second detection electrode 30 has a role of detecting an input position of a finger of a user approaching the detection region in the X direction.

The plurality of first lead-out wirings 24 and the plurality of second lead-out wirings 34 are formed in a region other than the detection region of the conductive film 12.

In the example shown in the drawing, both the first detection electrode 20 and the second detection electrode 30 are schematically shown in a strip shape but the detailed constitution thereof will be described in detail later.

FIG. 2 is a partial cross-sectional view showing a region in which the first detection electrode 20 and the second detection electrode 30 are superimposed to be perpendicular to each other in the conductive film 12 of the touch panel sensor 10 shown in FIG. 1.

In the region, as shown in FIG. 2, the conductive film 12 has the substrate 18 which is a transparent insulator (transparent insulating substrate), a first electrode layer 26 having the first detection electrode 20 and the dummy electrode 28 formed by the plurality of thin metal wires 40 on a main surface 18a of the substrate 18 (the surface on the main surface side), a protective layer 42 provided through an adhesive layer 41 so as to cover the surface of the first detection electrode 20 and the dummy electrode 28 of the first electrode layer 26 (the surface on the main surface side), a second electrode layer 36 having the second detection electrode 30 and the dummy electrode 38 formed by the plurality of thin metal wires 40 on a rear surface 18*b* (the surface opposite to the main surface) of the substrate 18, and a protective layer 44 provided through an adhesive layer 43 so as to cover the surface (the surface opposite to the main surface) of the second detection electrode 30 and the dummy electrode 38 of the second electrode layer 36.

As described above, the first detection electrode 20 and the second detection electrode 30 are respectively arranged on both sides of the substrate 18. Both the first detection electrode and the second detection electrode are formed of the thin metal wires 40 and function as detection electrodes which detect a touch position of a finger in the touch panel sensor 10.

By forming the first detection electrode 20 and the second detection electrode 30 on both surfaces of one substrate 18 respectively, even when the substrate 18 shrinks, a shift in positional relationship between the first detection electrode 20 and the second detection electrode 30 can be reduced.

In addition, since the dummy electrode 28 is provided to fill the gap between adjacent first detection electrodes 20 in the first electrode layer 26, and the dummy electrode 38 is provided to fill the gap between adjacent second detection electrodes 30 in the second electrode layer 36, a difference in density depending on the place of the thin metal wire can be removed and the visibility of the thin wire can be reduced.

In the present invention, the first electrode layer 26 may be constituted by using only the first detection electrode 20 and the second electrode layer 36 may be constituted by using only the second detection electrode 30, and the dummy electrodes 28 and 38 may be not provided.

The substrate 18 supports the first detection electrode 20 and the dummy electrode 28, and the second detection electrode 30 and the dummy electrode 38 and is preferably constituted of a transparent electrical insulating material. It is preferable that the substrate 18 is transparent and has flexibility. For example, as the substrate 18, a plastic film, a plastic plate, a glass plate, or the like can be used. For example, the plastic film and the plastic plate can be constituted of polyesters such as polyethylene terephthalate (PET), and polyethylene naphthalate (PEN), polyolefins such as polyethylene (PE), polypropylene (PP), polystyrene, ethylene-vinyl acetate copolymers (EVA), cycloolefin polymer (COP), and cycloolefin copolymer (COC), vinyl-based resins, in addition to polycarbonate (PC), polyamide, polyimide, acrylic resin, and triacetyl cellulose (TAC). It is preferable that the substrate 18 is constituted of polyethylene terephthalate (PET), polyolefins such as cycloolefin polymer (COP), and cycloolefin copolymer (COC) from the viewpoint of light transmittance, heat shrinkage, workability, and the like.

As the substrate 18, a treated support which has been subjected to at least one treatment of atmospheric pressure plasma treatment, corona discharge treatment, or ultraviolet irradiation treatment can be used. By performing the above-described treatment, a hydrophilic group such as OH group is introduced into the surface of the treated support and adhesiveness of the first detection electrode 20, the second detection electrode 30, and the dummy electrodes 28 and 38 is further improved. Among the above-described treatments, from the viewpoint of further improving adhesiveness of the first detection electrode 20, the second detection electrode 30, and the dummy electrodes 28 and 38, atmospheric pressure plasma treatment is preferable.

As shown in FIG. 2, the first detection electrode 20 and the second detection electrode 30 are respectively formed of the plurality of thin metal wires 40 in the first electrode layer 26 and second electrode layer 36 and are respectively electrically connected to each other.

As shown in plan view in FIGS. 3A and 3B which is a partially enlarged view of FIG. 3A, the first detection electrode 20 and the second detection electrode 30 are respectively constituted by combining a plurality of polygons formed into a mesh shape using the plurality of thin metal wires 40, rhombic cells (opening portions) 46 in the example shown in the drawings, and the cells 46 are shaped into polygons, for example, polygons having at least one of different shapes or sizes, rhombic shapes having different sizes in the example shown in the drawings, and constituted using the conduction electrode 50 having a random electrode pattern 48 electrically connected.

The conduction electrode 50 shown in FIGS. 3A and 3B is a conductive electrode characterized by the present invention and the thin metal wires 40 constituting the random electrode pattern 48 used for the conductive film of the present invention is partially disconnected on the outer side of the edge line 52 of the electrode shape corresponding to the electrode shape of the conduction electrode 50 to provide a disconnection portion 54. Then, the conduction electrode 50 is formed as a conduction electrode having a partially extended cell structure including the open cells 46 protruding from the electrode shape. As a result, dummy electrodes 56 which are electrically separated from the conduction electrode 50 by the disconnection portions 54 are provided on the both outer sides of the conduction electrode 50. These dummy electrodes 56 have the same random electrode pattern 48 as the conduction electrode 50 constituting the first detection electrode 20 and the second detection electrode 30, but the dummy electrodes 28 and 38 shown in FIG. 2 can be also constituted by the random electrode pattern.

The electrode shape of the conduction electrode 50 shown in FIGS. 3A and 3B is a preset strip shape extending in one direction and is an electrode shape having a predetermined electrode width in designing. The edge lines 52 of parallel straight lines which are preset image lines in designing on both sides thereof are defined.

In the conduction electrode 50 shown in the example of the drawings, an extended edge line 53 is set at a position separated by a predetermined fixed distance, 40 μm in the example shown in the drawings, from the edge line 52 of the electrode shape to the outer side.

In the present invention, a plurality of cells 46 (46*a*, 46*b*, 46*c*, and the like) having the thin metal wire 40 crossing the edge line 52 as one constitutional element are defined as first cells 45*a*. Accordingly, the plurality of cells 46 constituting the conduction electrode 50 have the first cells 45*a* formed of the thin metal wires 40 crossing the edge line 52.

Next, among the first cells 45*a*, the plurality of cells 46 (46*a*, 46*b*, and the like) in a region in which the intersections 58 of the cells 46 in which the whole cells are included in the inner side of the extended edge line 53 (at the center side of the electrode), are included in a range of from the edge line 52 to the extended edge line 53, that is, in a range in which the amount of protrusion protruding to the outer side of the edge line 52 is 40 μm, are defined as second cells 45*b*. That is, the second cells 45*b* are defined as cells 46 in which all apexes of a polygon formed of all of the intersections 58 of the thin metal wire 40 constituting one second cell 45*b* are included in the inner side of the extended edge line 53 and at least one intersection (apex) 58 of all of these intersections (apexes) 58 is included in the region between the edge line 52 and extended edge line 53.

Next, in terms of number proportion of the cell 46, among the second cells 45b included in such first cells 45a, 50% or more of the plurality of cells 46 (46a, 46b, and the like) included in the second cells 45b are defined as third cells 45c.

The thin metal wire 40 of the first cell 45a with the exception of the thin metal wire 40 constituting the third cell 45c is disconnected at a crossing position 59 with the edge line 52 and has the disconnection portion 54. That is, with the exception of the third cell 45c, the thin metal wires 40 of less than 50% of the second cells and the thin metal wires 40 of the second cells, and the thin metal wires 40 of the first cells 45a are disconnected on the edge line 52 and have the disconnection portions 54.

On the other hand, the thin metal wire 40 of the third cell 45c does not have the disconnection portion 54 at a portion which does not have disconnection on the edge line 52, that is, at the crossing position 59 of the edge line 52 and the thin metal wire 40. Accordingly, the third cell 45c is an open cell 46.

In this manner, in the conduction electrode 50, on the edge line 52 of the thin metal wire 40 of the third cell 45c, instead of not providing the disconnection portion 54, the thin metal wire 40 directly extending to the extended edge line 53 on the outer side of the intersection (apex) 58 of the third cell 45c, that is, the thin metal wire 40 constituting the cells 46 adjacent to each other in the outer side direction is disconnected to provide the disconnection portion 54.

Thus, the conduction electrode 50 is formed into an electrode shape having the partially extended edge line 52, that is, having partially extended cell structure.

Specifically, the example shown in FIGS. 3A and 3B is an example in which the random electrode pattern 48 is a random electrode pattern in which the randomness imparted to the rhombic pitch P of a regular electrode pattern in which the rhombic mesh pitch P is 200 μm and the inclined angle θ of the side of the rhombic shape is 30° is ±10%, and the amount of protrusion in the conduction electrode 50 of the present invention is set to 40 μm.

At this time, the cell 46a including the whole cell (all apexes) on the inner side of the extended edge line 53 is the first cell 45a, and since the intersection (apex) 58a of the cell 46a is located at a position 0.02029 mm (20.29 μm) apart from the edge line 52 to the outer side and is located on the inner side of the extended edge line 53, that is, in the range of the above-described amount of protrusion of 40 μm, the cell is the second cell 45b.

In such a cell 46a, two thin metal wires 40 directly extending toward the extended edge line 53 on the outer side of the intersection (apex) 58a (constituting cells 46 adjacent in the outer side direction) are disconnected and two disconnection portions 54 are provided. As a result, the cell 46a is the third cell in which the disconnection portion 54 is not provided in any of the thin metal wires 40 constituting the cell and remains as a closed cell 46 in a closed state.

In addition, since the intersection (apex) 58b of the cell 46b including the whole cell (all apexes) on the inner side of the extended edge line 53 is located at a position 0.02904 mm (29.04 μm) apart from the edge line 52 to the outer side and is located on the inner side of the extended edge line 53, that is, in the range of the above-described amount of protrusion of 40 μm, two thin metal wires 40 directly extending toward the extended edge line 53 on the outer side of the intersection (apex) 58b (constituting cells 46 adjacent in the outer side direction) are disconnected and two disconnection portions 54 are provided. As a result, the cell 46a remains in a state in which the cell is closed. Accordingly, the cell 46b corresponds to all of the first cell 45a, the second cell 45b, and the third cell 45c.

In contrast, since the intersection 58c (apex) of the cell 46c of which the thin metal wire 40 crosses the edge line 52 is located at a position 0.04736 mm (47.36 μm) away toward the outer side of the edge line 52 and is located on the outer side of the extended edge line 53, that is, in the range of the above-described amount of protrusion of 40 μm, disconnection is applied to each crossing position 59 where two thin metal wires 40 and the edge line 52 cross each other on the inner side of the intersection (apex) 58c and two disconnection portions 54 are provided. Accordingly, the cell 46c does not correspond to any of the first cell 45a, the second cell 45b, and the third cell 45c.

In this manner, since the cell 46c having the intersection 58c has disconnection at the crossing position 59 where the thin metal wire 40 and the edge line 52 cross each other, the cell is the open cell 46c and does not contribute to improving the conductivity of the electrode. However, even in the case of the cell 46 of which the thin metal wire 40 constituting the cell 46 and the edge line 52 cross each other (first cell 45a), the cell 46a having the intersection 58a and the cell 46b having the intersection 58b are closed cells 46 (third cells 45c) extended from the electrode shape and contribute to improving the conductivity of the electrode.

Figure 10A:
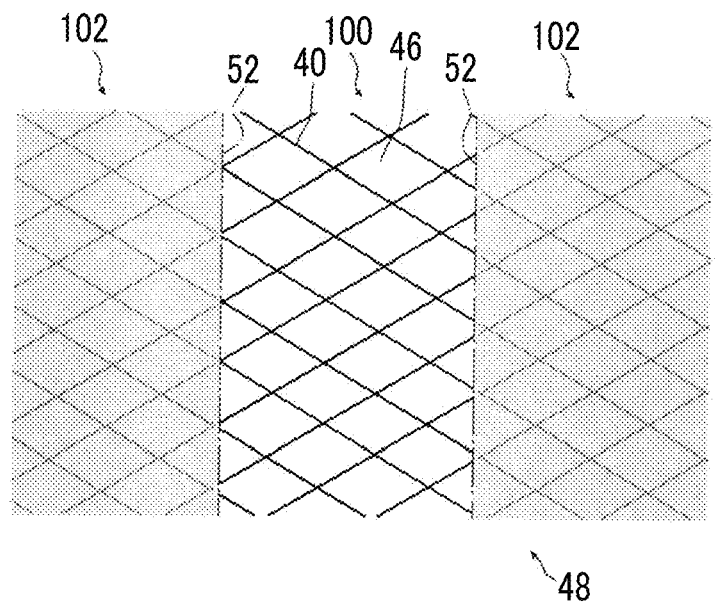
FIGS. 10A and 10B are a plan view schematically showing a conduction electrode used in a conventional conductive film and a partially enlarged view thereof.
Figure 10B:
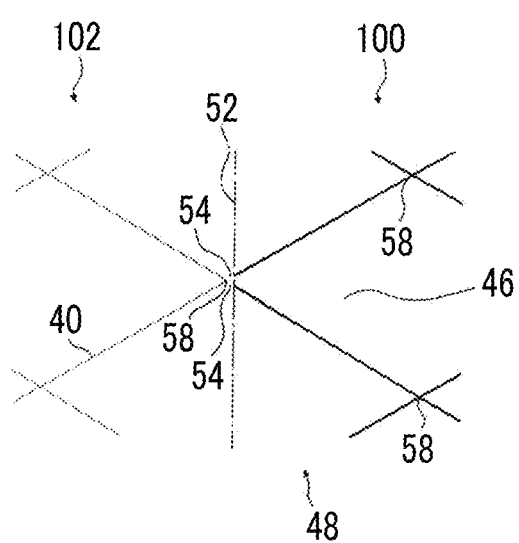

As a result, in the case of a conduction electrode constituted by the thin metal wire 40, when compared to in a conduction electrode 100 shown in FIGS. 10A and 10B, in the conduction electrode 50 shown in FIGS. 3A and 3B, the number of intersections 58 and the number of closed cells 46 (third cells 45c) can be increased, and thus it is possible to prevent a high resistance portion from being locally generated in the electrode.

The conduction electrode 50 shown in FIG. 3A has a strip-like electrode shape in which the edge lines 52 are formed of two parallel straight lines, but the present invention is not limited thereto. Various shapes including conventionally known electrode shapes can be applied.

Figure 4A:
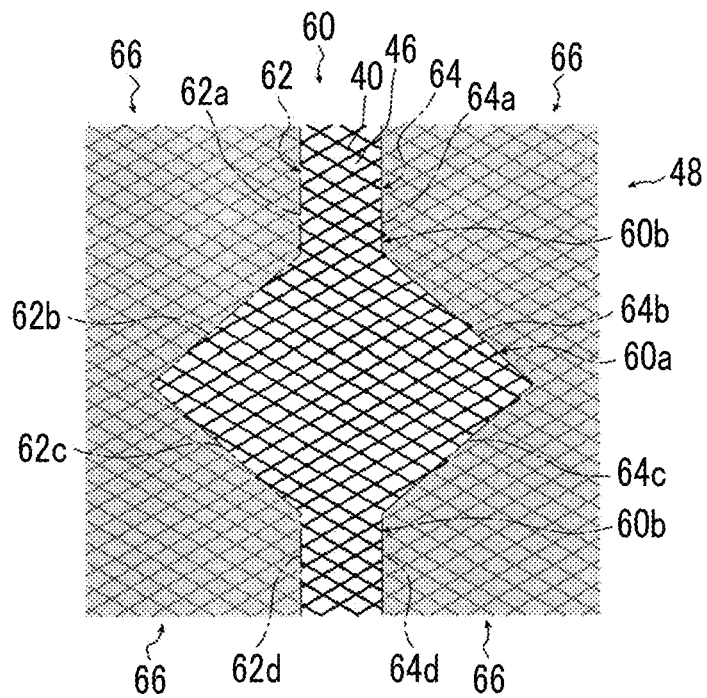
FIGS. 4A and 4B are a plan view schematically showing another example of a conduction electrode used for the conductive film shown in FIG. 1 and a partially enlarged view thereof.

In a conduction electrode 60 shown in FIG. 4A, two strip-like connection electrode portions 60b are connected to a unit electrode portion 60a having a rhombic (diamond) shape and the unit electrode has a preset electrode shape extending in one direction. Edge lines 62 and 64 on both sides are symmetrical with respect to the center line of the electrode shape along one direction and the respective lines are constituted by parallel line segments 62a and 64a parallel with the center line, inclined line segments 62b and 64b inclined to the center line at a predetermined angle, inclined line segments 62c and 64c reversely inclined to the center line at the same predetermined angle, and parallel line segments 62d and 64d parallel with the center line.

Figure 4B:
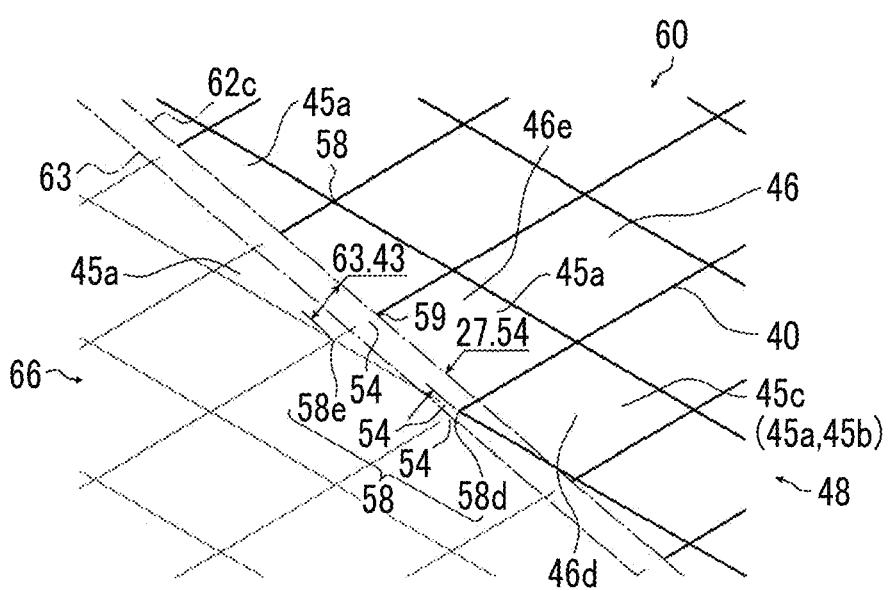

In the example shown in FIGS. 4A and 4B, the conduction electrode has the same random electrode pattern 48 as in the example shown in FIGS. 3A and 3B and is designed to set to have an amount of protrusion of 40 μm.

In the conduction electrode 60, as shown in FIG. 4B in which the inclined line segment 62c is partially enlarged, an intersection (apex) 58d of a cell 46d which is the first cell 45a is located at a position 0.02754 mm (27.54 μm) apart from the inclined line segment 62c of the edge line 62 to the outer side and is located on the inner side of the extended edge line 63 which is located at a position 40 μm separated from the inclined line segment 62c to the outer side, that is, in the range of the above-described amount of protrusion of 40 μm. Therefore, the cell 46d corresponds to the second cell 45*b* and the third cell 45*c* and is the closed cell 46. Two thin metal wires 40 directly extending toward the extended edge line 53 on the outer side of the intersection (apex) 58*d* are disconnected and two disconnection portions 54 are provided.

In contrast, since an intersection (apex) 58*e* of a cell 46*e* which is the first cell 45*a* is located at a position 0.06343 mm (63.43 μm) from the inclined line segment 62*c* to the outer side and is located on the outer side of the extended edge line 63, that is, at a position in the range of the above-described amount of protrusion of 40 μm, disconnection is applied to the crossing position 59 where one thin metal wire 40 and the inclined line segment 62*c* cross each other on the inner side of the intersection (apex) 58*e* and the disconnection portion 54 is provided. Therefore, the cell 46*e* corresponds to the first cell 45*a* but does not correspond to the second cell 45*b* and the third cell 45*c*.

In this manner, since the cell 46*e* having the intersection 58*e* has disconnection at the crossing position 59 where the thin metal wire 40 and the edge line 62 cross each other, the cell is an open cell 46 and does not contribute to improve the conductivity of the electrode. However, even in the cell 46 in which the thin metal wire 40 constituting the cell 46 and the edge line 62 cross each other, the cell 46*d* having the intersection 58*d* is a closed cell 46 (third cell 45*c*) which is extended from the electrode shape and contributes to improving the conductivity of the electrode.

As a result, in the case of a conduction electrode constituted by the thin metal wire 40, compared to in the conduction electrode 100 shown in FIGS. 10A and 10B, in the conduction electrode 60 shown in FIGS. 4A and 4B, the number of intersections 58 and the number of closed cells 46 (third cells 45*c*) can be increased and thus it is possible to prevent a high resistance portion from being generated.

As described above, in the conduction electrodes 50 and 60, the thin metal wires 40 constituting the cells 46 (first cells 45*a*) on the edge lines 52, and 62 and 64 on both sides of the electrode shape can have the disconnection portion 54 at the crossing position 59 when these cells 46 include the whole cells (all apexes) thereof on the inner side of the extended edge lines 53 and 63 (which are the second cells 45*b*), with the exception of the thin metal wires 40 constituting the cells 46 (third cells 45*c*) in which the intersections 58 of the thin metal wires 40 constituting the apexes of the polygon of the cells 46 are in a region in the range of a predetermined amount of protrusion, for example, in the example shown in the drawings, 40 μm, apart from the edge lines 52, and 62 and 64 to the outer side thereof. In addition, the thin metal wire 40 constituting the cell 46 of which the intersection (apex) 58 is in the range of the above-described amount of protrusion and the cell 46 which shares the intersection 58 on the outer side (adjacent to the intersection in the outer side direction) can have the disconnection portion 54 at a position adjacent to the intersection 58.

Accordingly, among the plurality of intersections (apexes) 58 of the plurality of cells 46 corresponding to the third cells 45*c*, each intersection (apex) 58 between adjacent edge line 52 and extended edge line 53 extends toward the extended edge line 53 and is connected to the thin metal wire 40 having the disconnection portion 54 in the middle thereof or the thin metal wire 40 leading to the apex of another third cell, or becomes an independent end point. These intersections are not connected to any of the thin metal wires 40. In the example shown in the drawings, the disconnection portions 54 are provided at positions slightly extended along the edge lines 52, and 62 and 64 in the plurality of thin metal wires 40 constituting the electrode pattern 48 and the conduction electrodes 50 and 60 and the dummy electrodes 56 and 66 on both sides of the respective conduction electrodes are physically separated from each other to make the conduction electrodes 50 and 60 and the dummy electrodes 56 and 66 electrically insulated (blocked). However, the present invention is not limited thereto and the dummy electrodes 56 and 66 may not be provided. In this case, the thin metal wire 40 is not present on the outer side of the disconnection portion 54 and the thin metal wire 40 is not present on any extension of the outer side of the independent end point.

In other words, in the case in which, in the conduction electrodes 50 and 60, the intersection 58 of the thin metal wire 40 constituting the apex of the polygon of the cell 46 corresponding to the first cell 45*a* corresponds to the third cell 45*c* among the second cells 45*b* in the region in the range in which the extended edge lines are separated by a predetermined amount of protrusion from the edge lines 52, and 62 and 64 to the outer side thereof, the disconnection portion 54 may not be provided at the crossing positions 59 with the edge lines 52, and 62 and 64. In addition, among the cells 46 (first cells 45*a*) constituted by the thin metal wires 40 crossing each of the edge lines 52, and 62 and 64 on both sides of the electrode shape of each of the conduction electrodes 50 and 60, in the cells 46 (the third cells 45*c* among the second cells 45*b*) including the whole cells (all apexes) in a closed state on the inner side of the extended edge lines 53 and 63 separated by a predetermined amount of protrusion from the edge lines 52, and 62 and 64 to the outer side thereof, the disconnection portion 54 may not be provided at the crossing positions where the thin metal wires 40 constituting the cells 46 and the edge lines 52, and 62 and 64 cross each other.

In the examples of the above-described conduction electrodes 50 and 60, the intersections (apexes) 58 of the thin metal wires 40 not having the disconnection portion 54 at the crossing positions 59 with the edge lines 52, and 62 and 64, and the cells 46 corresponding to the third cells 45*c* are all intersections 58 in the region in the range in which the extended edge lines are separated by a predetermined amount of protrusion from the edge lines 52, and 62 and 64 to the outer side thereof (in the region between the edge lines 52, and 62 and 64 and the extended edge lines 53 and the 63), and all cells 46 related to all of these intersections 58, or all cells 46 corresponding to the second cells 45*b* including the whole cells (all apexes) in a closed state on the inner side of the extended edge lines 53 and 63. That is, in the examples shown in the drawings, all of the cells 46 corresponding to the second cells 45*b* are all of the third cells 45*c*.

However, the present invention is not limited thereto and the cells 46 corresponding to the third cells 45*c* may be 50% or more of cells 46 of all of the cells corresponding to the second cells in terms of number proportion of the cell 46. Alternatively, the intersections (apex) 58 of the thin metal wires 40 not having the disconnection portion 54 may be 50% or more of the intersections (apexes) 58 of all of the intersections 58 in the regions between the edge lines 52, and 62 and 64 and the extended edge lines 53 and 63, and the cell 46 corresponding to the third cells 45*c* may be the cells 46 related to these intersections 58.

In the present invention, it is required to set 50% or more of the cells 46 among the second cells 45*b* to the third cells 45*c*.

Therefore, in less than 50% of the cells 46 among the second cells 45*b* included in the first cells 45*a*, the disconnection portion 54 is provided at the crossing position 59 where the thin metal wire 40 and the edge lines 52, and 62 and 64 cross each other. That is, the disconnection portion 54 is provided at the crossing positions 59 of the thin metal wires 40 constituting the first cells 45*a* with the exception of the thin metal wires constituting the plurality of cells 46 corresponding to the third cells 45*c,* and the edge lines 52, and 62 and 64.

In the present invention, the reason for not providing the disconnection portion at the crossing positions with the edge line in 50% or more of the cells among the cells corresponding to the second cells, or in the intersections is that the cell in which the disconnection portion is not provided at the crossing position with the edge line or at less than 50% of the intersections (apexes), the number of closed cells in the vicinity of the edge line or intersections thereof is small and thus the resistance increases to cause an increase in resistance.

In the examples shown in FIGS. 3A, 3B, 4A, and 4B, the amount of protrusion from the edge lines 52, and 62 and 64 of the electrode shapes of each of the conduction electrodes 50 and 60 to the outer side thereof is 40 μm, but in the present invention, there is no limitation thereto. It is required that the amount of protrusion is 7% to 20% of the mesh size of the conduction electrode. Here, the mesh size is defined as a circle having the smallest size in which adjacent cells are included, that is, a diameter of a minimum circumscribed circle of the cells.

In the present invention, the mesh size is preferably in a range of 300 μm to 600 μm, and the amount of protrusion preferably is in a range of 20 μm to 120 μm and more preferably in a range of 20 μm to 100 μm.

In the present invention, the reason for limiting the amount of protrusion to 7% to 20% of the mesh size is that when the amount of protrusion is less than 7%, the effect of reducing variation in resistance is too small. In addition, when the amount of the protrusion is more than 20%, the amount of change in the electrode width is too large and the electrostatic capacitance Cm value increases. Thus, there is a concern of a decrease in sensor sensitivity.

In addition, as the amount of protrusion increases, the resistance value of the electrode decreases. However, there is a high possibility of significantly shifting the shape from the presumed electrode edge line and thus this shifting may cause an error at the time of detection in some cases.

In the present invention, although not particularly limited, the length of the disconnection portion 54 is preferably 5 μm to 30 μm and more preferably 10 μm to 20 μm. When the length of the disconnection portion 54 is as short as less than 5 μm, there is a possibility of a short circuit occurring due to foreign substances or the like. In contrast, when the length of the disconnection portion is as long as more than 30 μm, the disconnection portion itself becomes visible and there is a possibility of deterioration of visibility due to a difference in density between the non-electrode portion with disconnection and the electrode portion without disconnection.

In the present invention, the edge lines preset in designing, for example, the edge lines 52, and 62 and 64 on both sides of the electrode shapes of the conduction electrodes 50 and 60 shown in FIGS. 3A, 3B, 4A, and 4B can be defined as follows.

First, since the disconnection portions 54 present along the electrode width of the conduction electrodes 50 and 60 are present in the vicinity of the edge lines along the edge lines 52, and 62 and 64 on both sides of the preset electrode shapes, two connection lines formed by respectively connecting each one side of the center sides, that is, points on the inner side, of all of the present disconnection portions 54, and a regression line of the center of the connection line of all of the disconnection portions 54 of these two lines is obtained. While setting the obtained regression line as an approximate center line, each connection line of the two connection lines is considered as a straight line having a line width of a fixed length, for example, the length presumed as the amount of protrusion, in the examples shown in the drawings, 40 μm, and each connection line is classified as at least one of one or more parallel line segment regions respectively having a length 5 times or more of the mesh size and parallel with the approximate center line or one or more inclined line segment regions inclined to the approximate center line.

For example, in the case of the conduction electrode 50 shown in FIG. 3A, the two connection lines of the disconnection portions 54 present in two parallel line segment regions along the vicinity of the edge lines 52 on both sides. At this time, in order to obtain a one side edge line 52 of the edge lines 52 on both sides of the electrode shape preset in designing, first, in the parallel line segment region on the connection line on one side of the electrode shape, a regression line of the points on the inner side of all of the disconnection portions 54 constituting the connection line in the parallel line segment region is obtained. Subsequently, the points on the inner side of two or more disconnection portions 54 present in the parallel line segment region on the center side from the obtained regression line, that is, on the approximate center line side, are selected and the selected points are used to form a parallel line segment to be parallel with the approximate center line. The formed parallel line segment parallel with the approximate center line can be defined as the edge line 52 preset in designing. Thus, the edge line 52 on one side in designing can be defined and in the same manner, the edge line 52 on the other side in designing can be also defined.

On the other hand, in the case of the conduction electrode 60 shown in FIG. 4A, two connection lines formed by respectively connecting the points on the inner side of all of the disconnection portions 54 on both sides are classified into four parallel line segment regions along the vicinities of respective parallel line segments 62*a* and 64*a,* and parallel line segments 62*d* and 64*d* parallel with the edge lines 62 and 64 on both sides and four inclined line segment regions along vicinities of respective inclined line segments 62*b* and 64*b,* and parallel line segments 62*c* and 64*c* inclined to the center line. At this time, in order to obtain a one side edge line of the edge lines 62 and 64 on both sides of the preset electrode shape in designing, for example, the edge line 62, in two parallel line segment regions on this one connection line, as described above, two parallel line segments parallel with respective approximate center lines using the points on the inner side of two or more disconnection portions 54 present in the parallel line segment region on the center side from a regression line of the points on the inner side of all of the disconnection portions 54 constituting the connection line in each parallel line segment region are formed. The formed parallel line segment parallel with the approximate center line can be defined as the parallel line segments 62*a* and 62*d* of the edge line 62 preset in designing. Thus, the parallel line segments 62*a* and 62*d* of the edge line 62 in designing can be defined and in the same manner, the parallel line segments 64*a* and 64*d* the edge line 64 on the other side in designing can be also defined.

Further, in order to obtain a one side edge line 62, in two inclined line segment regions on the connection line on this one side, regression lines of the points on the inner side of all of the disconnection portions 54 constituting the connection line in each inclined line segment region are respectively obtained. The points on the inner side of one or more disconnection portions 54 present in each inclined line segment region on the center side from each regression line obtained are respectively selected and the selected points are used to form two inclined line segments to be respectively inclined to the approximate center line at the same angle. The formed two inclined line segments are defined as the inclined line segments 62b and 62c of the edge line 62 preset in designing. Thus, the inclined line segments 62b and 62c of the edge line 62 in designing are defined and in the same manner, the inclined line segments 64b and 64c of the edge line 64 on the other side in designing are defined.

As described above, the edge lines on both sides of the electrode shape of the conduction electrode preset in designing can be specified based on a large number of disconnection portions present in an actual conduction electrode produced.

Here, the electrode pattern of the conduction electrode used in the present invention is a random pattern formed by imparting irregularity to at least one of the angle of the apex constituting the polygon of the cell, the length of the side, the number of sides, the pitch of the polygon, or the like. Since the intersection is not arranged at a fixed position in the random pattern, the conductivity of the electrode easily varies without applying the design as in the present invention in the case of designing an electrode edge.

The electrode pattern 48 of the conduction electrode 50 and the electrode pattern 48 of the dummy electrode 56 shown in FIGS. 3A and 3B are random electrode patterns constituted by combining the plurality of rhombic cells 46 and imparting irregularity to the length of the side constituting the rhombic cell 46, and the arrangement pitch. Since the conduction electrode 60 and the dummy electrode 66 shown in FIGS. 4A and 4B and the conduction electrode 100 and the dummy electrode 102 shown in FIGS. 10A and 10B have the same electrode pattern 48, in the following description, the conduction electrode 50 and the dummy electrode 56 shown in FIGS. 3A and 3B will be described as a representative example.

The shape of the cells 46 formed of the thin metal wires 40 constituting the electrode pattern 48 of the conduction electrode 50 and the dummy electrode 56 is rhombic, but the present invention is not limited thereto. The shape of the cell may be polygonal. For example, geometric constitution formed by combining triangles such as equilateral triangle, isosceles triangle, and right triangle, quadrangles such as square, rectangle, rhomboid, parallelogram and trapezoid, (equilateral) n-gons such as (equilateral) hexagon and (equilateral) octagon, star, and the like may be used.

The term "polygon" includes not only a geometrically perfect polygon but also a "substantial polygon" in which the above perfect polygon is slightly changed. As examples of the slight change, addition of a point element and a line element that are small compared with the shape of the cell 46 formed of the thin metal wire 40, a partial defect of each side of the thin metal wire 40 that forms the cell 46, curving the constitutional side, and the like can be mentioned.

The thin metal wire 40 is not particularly limited and is formed of, for example, ITO, Au, Ag, or Cu. In addition, the thin metal wire 40 may be constituted by further incorporating a binder into ITO, Au, Ag, or Cu. The thin metal wire 40 including a binder allows easy bending working and thus bending resistance is improved. Therefore, the thin metal wire 40 is preferably constituted of a conductor including a binder. As the binder, a binder used for the wiring of the conductive film can be appropriately used and for example, binders described in JP2013-149236A can be used.

A method of forming the thin metal wire 40 of the conduction electrode 50 and the dummy electrode 56 constituting the first detection electrode 20 and the second detection electrode 30 is not particularly limited. For example, the thin metal wire can be formed by exposing a photosensitive material having an emulation layer containing photosensitive silver halide, and performing a development treatment on the material. In addition, the conduction electrode 50 and the dummy electrode 56 having the disconnection portion 54 in the thin metal wire 40 can be formed by forming metal foils on the substrate 18, printing a resist on each metal foil into a pattern shape or forming a pattern by exposing and developing the resist applied onto the entire surface, and etching a metal of an opening portion. In addition to the above method, the conduction electrode 50 and the dummy electrode 56 constituting the first detection electrode 20 and the second detection electrode 30, including fine particles of the material constituting the conductor be formed by a method of printing a paste including fine particles of the material constituting the above-described conductor and plating the paste with a metal, a method of using an ink jet method using an ink including fine particles of the material constituting the above-described conductor, and the like.

For example, the first terminal portion 22, the first lead-out wiring 24, the second terminal portion 32, and the second lead-out wiring 34 can be formed simultaneously or separately by the above-described method of forming the thin metal wire 40.

The electrode width of the conduction electrode 50 and the electrode width of the conduction electrode 60 are not particularly limited. For example, the electrode width is preferably 0.3 mm to 7.0 mm and the electrode width of a reception electrode is more preferably 0.5 mm to 3.0 mm and the electrode width of a driving electrode is more preferably 3.0 mm to 6.0 mm. The electrode width used therein can refer to a length of the conduction electrode such as the conduction electrode 50 or the conduction electrode 60 in a direction perpendicular to the extending direction (one direction) and can be defined as a distance between the two edge lines 52. However, in the case of the shape in which the width changes in the middle thereof as in the conduction electrode 60, the electrode width refers to the width of the narrowest portion.

Here, as the electrode width becomes narrower, the effect of increasing the number of intersections, that is, closed cells, of the conduction electrode, is significant. However, when the electrode width is narrower than the lower limit of the above range, the absolute number of intersections and closed cells decreases and thus the resistance of the entire electrode increases. Thus, this case is not preferable. On the other hand, when the electrode width is wide, the absolute number of intersections and closed cell of the conduction electrode is large, and thus the effect of increasing the number of intersections and closed cells of the conduction electrode is small. Accordingly, when the electrode width is in the above-described reception electrode range, the effects of the present invention are highly easily exhibited.

The line width of the thin metal wire 40 is not particularly limited. For example, the line width may be 0.5 µm to 30 µm and is preferably 1.0 µm to 10 µm, more preferably 1.0 µm to 7 µm, and most preferably 1.0 µm to 4 µm. As long as the line width is in the above range, the first detection electrode 20 and the second detection electrode 30 can be relatively easily formed to have a low resistance.

In the case in which the thin metal wire 40 is applied to peripheral wirings (for example, the first lead-out wiring 24 and second lead-out wiring 34) in a conductive film for a touch panel, the line width of the thin metal wire 40 is preferably 500 µm or less, more preferably 50 µm or less, and particularly preferably 30 µm or less. When line width is within the above range, a touch panel electrode having low resistance can be relatively easily formed.

In addition, in the case in which the thin metal wire 40 is applied to peripheral wirings in a conductive film for a touch panel, a mesh electrode pattern can be formed by the peripheral wirings in the conductive film for a touch panel. In this case, the line width is not particularly limited and is preferably 30 µm or less, more preferably 15 µm or less, more preferably 10 µm or less, particularly preferably 9 µm or less, and most preferably 7 µm or less. The line width is preferably 0.5 µm or more and more preferably 1.0 µm or more. When the line width is within the above range, peripheral wirings having low resistance can be relatively easily formed. It is preferable that the peripheral wirings in the conductive film for a touch panel are formed into a mesh pattern, since it is possible to enhance uniformity in lowering of resistance by the irradiation of the detection electrode (conductive layer), the terminal portion, and the peripheral wirings (lead-out wirings), and also, in the case in which a transparent adhesive layer is attached, the peel strength of the detection electrode, the terminal portion, and the peripheral wirings can be maintained to be constant so that a small in-plane distribution can be achieved.

The thickness of the thin metal wire 40 is not particularly limited and is preferably 0.001 µm to 200 µm, more preferably 30 µm or less, even more preferably 20 µm or less, particularly preferably 0.01 µm to 9 µm, and most preferably 0.05 µm to 5 µm. When the thickness is within the above-described range, a detection electrode, a terminal portion, and peripheral wirings having low resistance and excellent durability can be relatively easily formed.

The protective layer 42 is provided to protect the first detection electrode 20 and the protective layer 44 is provided to protect the second detection electrode 30. The protective layers 42 and 44 are not particularly limited in the constitution thereof. For example, glass, polycarbonate (PC), polyethylene terephthalate (PET), acrylic resin (PMMA), or the like can be used.

The adhesive layers 41 and 43 are provided to fix the respective protective layers 42 and 44 onto the substrate 18. For any of these adhesive layers, for example, an optically transparent adhesive (OCA) and an optically transparent resin (OCR) such as UV curable resin can be used.

However, it is required for at least one of the first detection electrode 20 or the second detection electrode 30 to use the conduction electrode characterized by the present invention, for example, the conduction electrodes 50 and 60 shown in FIGS. 3A and 4A. In this case, it is preferable to use the respective dummy electrodes 56 and 66 together with the conduction electrodes 50 and 60.

In the case of using the conduction electrode of the present invention such as the conduction electrodes 50 and 60 for at least one of the first detection electrode 20 or the second detection electrode 30, for the other electrode, a so-called conduction electrode may be used, for example, the conduction electrode of the present invention such as the conduction electrodes 50 and 60 may be used, the conventional conduction electrode 100 shown in FIGS. 10A and 10B may be used, or other conventionally known electrodes may be used.

In the conductive film 12 of the present invention, when the first detection electrode 20 is set to a viewing side (also referred to as a top side) electrode, the second detection electrode 30 is set to a display side (also referred to as a bottom side) electrode.

However, in the case of using the conductive film 12 of the present invention as a touch panel sensor, from the viewpoint of ease and accuracy of detection, it is preferable that an electrode having a narrow electrode width is used for the top side first detection electrode 20 and an electrode having a wide electrode width is used for the bottom side second detection electrode 30. In this case, it is preferable to use the conduction electrode of the present invention, for example, the conduction electrode 50 or 60 shown in FIG. 3A or 4A for the top side first detection electrode 20. In contrast, since the electrode width can be set to be wide and the number of intersections formed of closed cells is sufficiently secured in the second detection electrode 30, the effect of application of the present invention is weak and thus the conventional conduction electrode 100 shown in FIGS. 10A and 10B can be used or other conventionally known electrodes can be used. In such a case, it is needless to say that the conduction electrode of the present invention can be also used for the second detection electrode 30.

Since all of the conduction electrode 50 shown in FIG. 3A, the conduction electrode 60 shown in FIG. 4A, and the conventional conduction electrode 100 shown in FIGS. 10A and 10B are formed of the random electrode pattern 48, in the case of using at least one conduction electrode of these conduction electrodes for both the first detection electrode 20 and the second detection electrode 30, the visibility of the thin metal wires 40 of each electrode pattern 48 of the first detection electrode 20 and the second detection electrode 30, and the visibility of the synthesized electrode pattern of both the electrode patterns 48 of the of the first detection electrode 20 and the second detection electrode 30, specifically, the visibility of moire occurring due to interference between the synthesized electrode pattern and the black matrix (BM) or the pixel arrangement pattern of RGB pixels of the display device, can be reduced.

The conductive film according to the first embodiment of the present invention and the touch panel sensor provided with the same are basically constituted as described above.

In the conductive film 12 of the first embodiment shown in FIG. 2, the first detection electrode 20 and second detection electrode 30 are respectively formed on both the upper side and lower side surfaces of the substrate 18, but the present invention is not limited thereto. The first detection electrode 20 and second detection electrode 30 may be arranged on one side of the substrate 18 through an insulating layer and two conductive film elements in which the first detection electrode 20 and the second detection electrode 30 formed of the plurality of thin metal wires 40 are formed on one surface of each of two substrates 18 and 19 (upper side surface in FIG. 5) as in a conductive film 12A of a second embodiment of the present invention shown in FIG. 5 may be superimposed.

Figure 5:
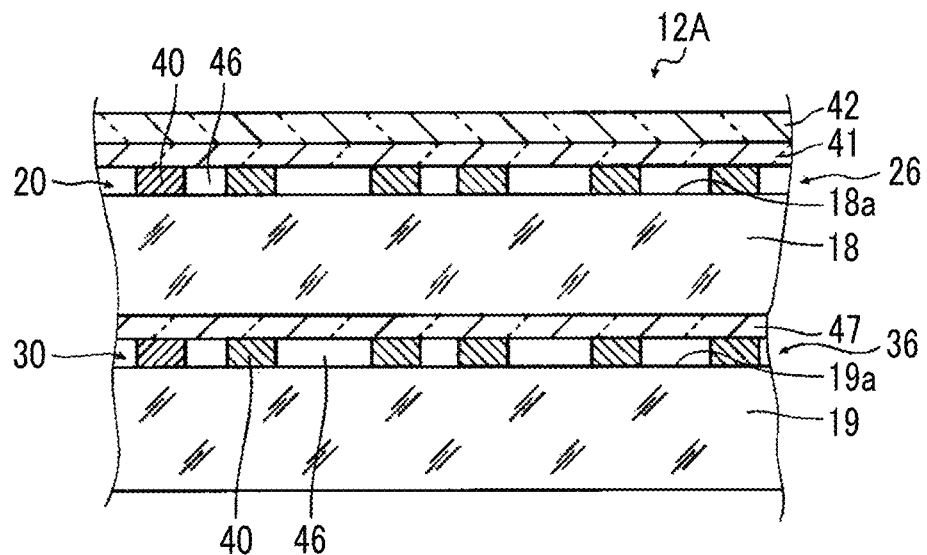
FIG. 5 is a cross-sectional view schematically showing another example of a conductive film according to another embodiment of the present invention.

The conductive film 12A of the second embodiment of the present invention shown in FIG. 5 has a lower side second substrate 19, a second electrode layer 36 having a second detection electrode 30 formed of a plurality of thin metal wires 40 formed on an upper side surface 19a of on the second substrate 19, an adhesive layer 47 formed on the second electrode layer 36 so as to cover the plurality of thin metal wires 40 of the second detection electrode 30, an upper side first substrate (substrate) 18 arranged to adhere onto the second electrode layer 36 with the adhesive layer 47, a first electrode layer 26 having a first detection electrode 20 formed of a plurality of thin metal wires 40 formed on an upper side surface 18a of the first substrate 18, an a protective layer 42 adhering onto the first electrode layer 26 through an adhesive layer 41 in FIG. 5.

Here, it is required to use the conduction electrode of the present invention, for example, the conduction electrode 50 or 60 formed of the random electrode pattern 48 constituted by the plurality of cells 46 formed of the thin metal wires 40 for at least one of the first detection electrode 20 or the second detection electrode 30, which is the same as in the example shown in FIG. 2.

In the conductive film 12A of the second embodiment of the present invention shown in FIG. 5, the first electrode layer 26 is provided with only the first detection electrode 20 and the second electrode layer 36 is provided with only the second detection electrode 30. However, the present invention is not limited thereto. As in the conductive film 12 of the first embodiment of the present invention shown in FIG. 2, the first electrode layer 26 and the second electrode layer 36 may be respectively provided with the dummy electrodes 28 and 38.

Accordingly, in the conductive film 12A shown in FIG. 5, the first detection electrode 20 and the second detection electrode 30 may be configured as in the conductive film 12 shown in FIG. 2, and thus the detailed description thereof will be omitted.

The conductive film according to the second embodiment of the present invention is basically constituted as described above.

Figure 6:
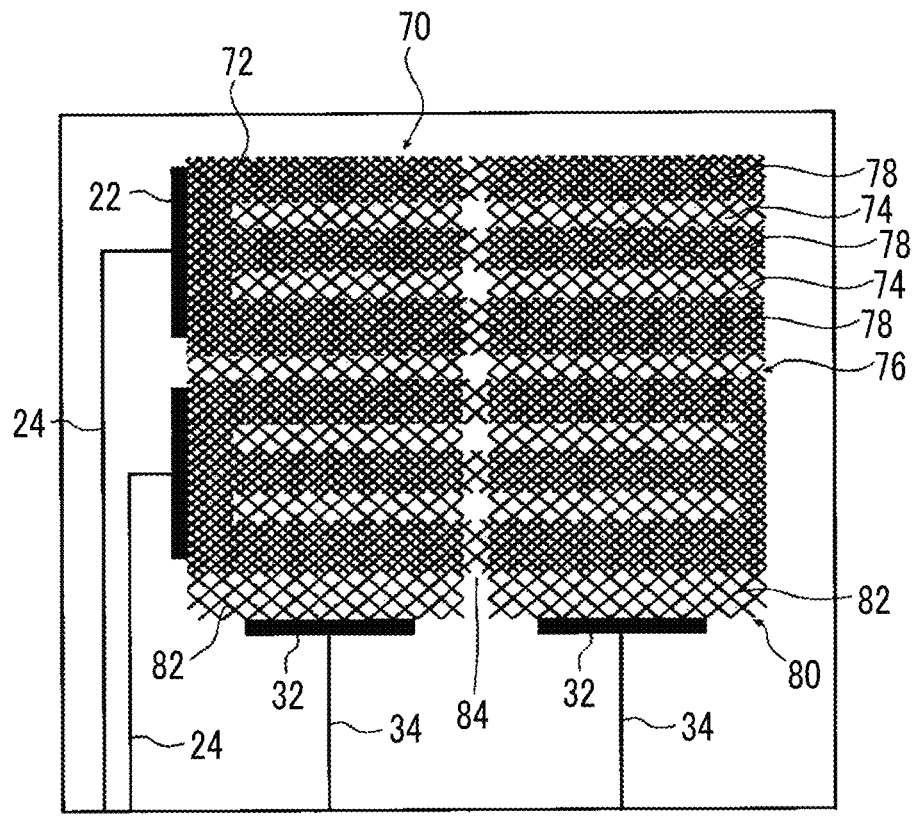
FIG. 6 is a plan view schematically showing an example of a conductive film according to another embodiment of the present invention.

In the conductive film 12 of the first embodiment shown in FIG. 1, the plurality of first detection electrodes 20 having the same electrode width and the plurality of second detection electrodes 30 having the same electrode width are perpendicular to one another. However, the present invention is not limited thereto. As shown in FIG. 6, a first detection electrode 70 may have an electrode width different from the width of a second detection electrode 80.

Figure 7:
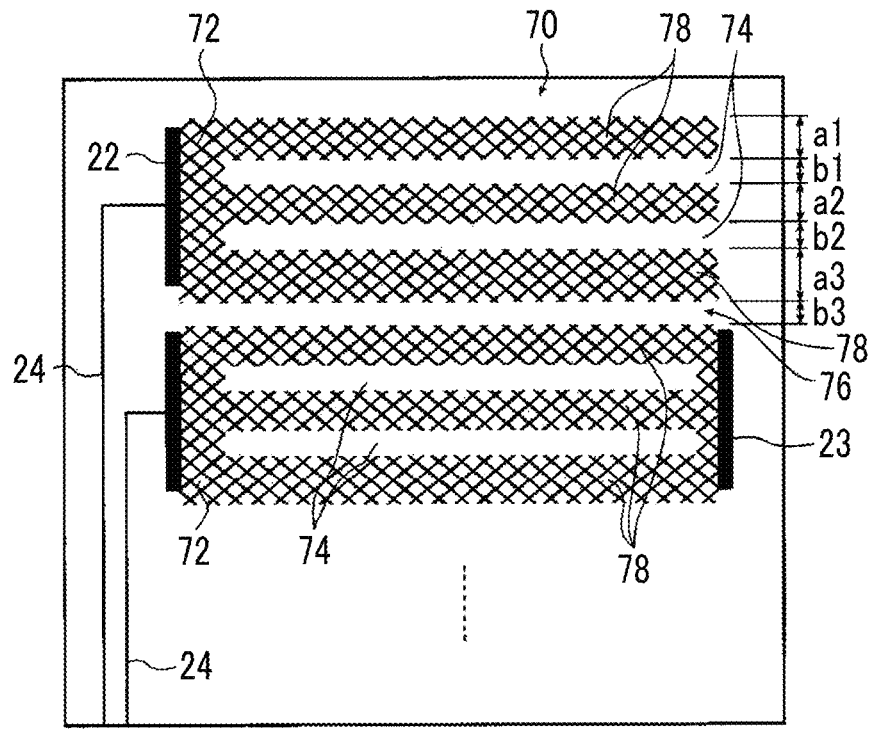
FIG. 7 is a plan view schematically showing the constitution of an electrode of the conductive film shown in FIG. 6 on a viewing side.
Figure 8:
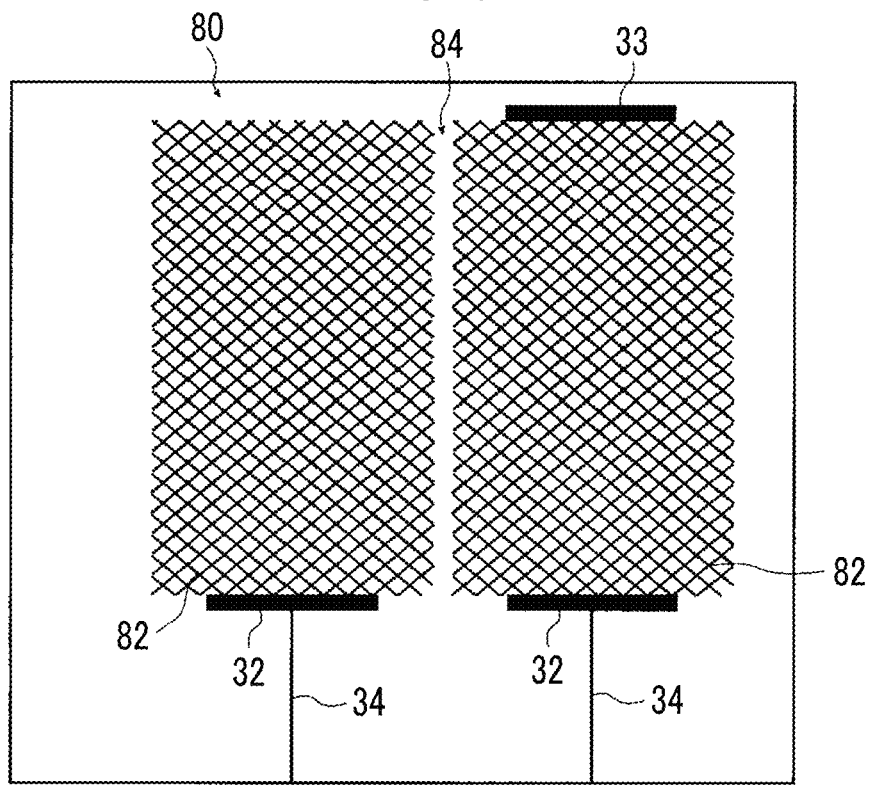
FIG. 8 is a plan view schematically showing the constitution of an electrode of the conductive film shown in FIG. 6 on the side opposite to the viewing side.

FIG. 6 is a plan view schematically showing an example of a conductive film according to a third embodiment of the present invention, FIG. 7 is a plan view schematically showing the constitution of the electrode of the conductive film show in FIG. 6 on a viewing side, and FIG. 8 is a plan view schematically showing the constitution of the electrode of the conductive film show in FIG. 6 on the side opposite to the viewing side.

A conductive film 12B according to a third embodiment of the present invention in the same drawing has the same cross-sectional structure as in the first and second embodiments, for example, the cross-sectional structure shown in FIG. 2 or 5, and the constitution as seen in plan view is different. Thus, the cross-sectional structure thereof will be omitted.

The conductive film 12B shown in FIG. 6 has a plurality of first detection electrodes 70 constituted by a conduction electrode 72 according to the present invention, and a plurality of second detection electrodes 80 constituted by a conduction electrode 82 according to the present invention, and the both electrodes are arranged to be perpendicular to each other. In the first detection electrode 70, the conduction electrode 72 includes a non-conduction portion 74 therein and has a comb-shaped structure as a whole.

A combined pattern of the electrode pattern of the conduction electrode 72 of the first detection electrode 70 and the electrode pattern of the conduction electrode 82 of the second detection electrode 80 is formed. It is preferable for the conduction electrode 82 to use the conduction electrode according to the present invention. However, the conventional conduction electrode 100 shown in FIGS. 10A and 10B or a conventionally known electrode may be used.

In FIG. 6, a dummy electrode 76 is constituted by the thin metal wires 40 as in the conduction electrode 72. In addition, the non-conduction portion 74 formed on the conduction electrode 72 is constituted by the thin metal wires 40 as in the conduction electrode 72. The dummy electrode is electrically separated from the conduction electrode 72 and the non-conduction portion 74 and the dummy electrode 76 are constituted by the thin metal wires 40 so that a so-called dummy wiring portion is formed. By forming the dummy wiring portion, almost the entire surface is covered by the polygonal cells 46 with random shapes (hereinafter also simply refer to random cells) of the thin metal wires 40 arranged at intervals with irregularity. Thus, it is possible to prevent a decrease in visibility.

In the same manner, a dummy electrode 84 is constituted by the thin metal wires 40 as in the conduction electrode 82. The dummy electrode is electrically separated from the conduction electrode 82 and the dummy electrode 84 is constituted by the thin metal wire 40 so that so-called dummy wiring portion is formed. By forming the dummy wiring portion, almost the entire surface is covered by the random cells 46 of the thin metal wires 40 arranged at intervals with irregularity. Thus, it is possible to prevent a decrease in visibility. The dummy wiring portion constituted by the thin metal wire 40 has the disconnection portion 54 in the thin metal wire 40 and is electrically separated the conduction electrode 72 and the conduction electrode 82.

FIG. 7 schematically shows the constitution of the electrode of the conductive film 12B shown in FIG. 6 on the viewing side. FIG. 7 further shows two types of conduction electrodes 72. The first detection electrode 70 includes two conduction electrodes 72 constituted by the plurality of cells 46 formed of the thin metal wire 40. Each conduction electrode 72 is electrically connected to the first terminal portion 22 at one end. Each first terminal portion 22 is electrically connected to one end of each first lead-out wiring 24. Each first lead-out wiring 24 is electrically connected to the FPC not shown in the drawing at the other end. Each conduction electrode 72 is electrically separated from the dummy electrode 76.

Each conduction electrode 72 extends a first direction (X direction) and is arranged in parallel with each other. Each conduction electrode 72 includes a slit-like non-conduction portion 74 which is electrically separated from each conduction electrode 72. Each conduction electrode 72 includes a plurality of auxiliary conduction electrode column 78 divided by each slit-like non-conduction portion 74. The slit-like non-conduction portion 74 is opened at the other end.

As described above, since the auxiliary conduction electrode column 78 and the conduction electrode 72 have a narrow electrode width, it is particularly preferable that the auxiliary conduction electrode column and the conduction electrode are constituted by the conduction electrode characterized by the present invention.

As shown in FIG. 7, since the conduction electrode includes the slit-like non-conduction portion 74, the conduction electrode 72 positioned at the end portion side of the conductive film 12B (the upper side in FIG. 7) has a comb-like structure. In the embodiment, the conduction electrode 72 has two slit-like non-conduction portions 74, and thus three auxiliary conduction electrode columns 78 are formed. The number of auxiliary conduction electrode columns 78 is not limited to three lines. Each auxiliary conduction electrode column 78 has the same electrical potential since each auxiliary conduction electrode column is respectively connected to each first terminal portion 22.

As shown in FIG. 7, in the conductive film 12B, each conduction electrode 72 includes the non-conduction portion 74 electrically separated from the conduction electrode 72 therein and in the case in which the area of each conduction electrode 72 is set to A and the area of each non-conduction portion 74 is set to B, it is preferable that a relationship of 5%<(B/(A+B))×100<97% is satisfied. The area A refers to the total area of one conduction electrode 72 from one end to the other end, and the area B refers to the area of the non-conduction portion 74 included in a region from one end to the other end of one conduction electrode 72. In addition, it is more preferable that a relationship of 10%≤(B/(A+B))×100≤80% is satisfied and it is still more preferable that a relationship of 10%≤(B/(A+B))×100≤60% is satisfied.

FIG. 7 shows still another conduction electrode 72. The conduction electrode 72 positioned at the center of the conductive film 12B (the lower side in FIG. 7) includes an additional first terminal portion 23 at the other end. The slit-like non-conduction portion 74 is closed in the conduction electrode 72. The inspection of each conduction electrode 72 can be easily performed by providing the additional first terminal portion 23.

In the embodiment, in the case in which the area of the conduction electrode 72 is set to A1 and the area of the slit-like non-conduction portion 74 is set to B1, 10%≤(B1/(A1+B1))×100≤80% is preferable and 40%≤(B1/(A1+B1))×100≤60% is more preferable. Within this range, a difference in electrostatic capacitance between when a finger touches the electrode, and when a finger does not touch the electrode is large. That is, is it possible to increase detection accuracy.

The area A1 of the conduction electrode 72 and the area B1 of the non-conduction portion 74 in FIG. 7 can be obtained by drawing a virtual line so as to come into contact with the auxiliary conduction electrode column 78 and calculating the area of a region surrounded by the virtual line.

In the case in which a total width of the widths of the auxiliary conduction electrode columns 78 is set to Wa, and a total of the total width of the non-conduction portions 74 and the width of the dummy electrode 76 is set to Wb, a relationship of Wa≤(Wa+Wb)/2 is satisfied.

Here, as shown in FIG. 7, a total of the widths a1, a2, and a3 of the auxiliary conduction electrode columns 78 is Wa and a total of the widths b1 and b2 of the non-conduction portions 74 and the width b3 of the dummy electrode 76 is Wb.

In another embodiment, it is more preferable that the total width Wa of the width of each auxiliary conduction electrode column 78, and the total width Wb of the widths of each non-conduction portion 74 satisfy relationships of 1.0 mm≤Wa≤5.0 mm and 1.5 mm≤Wb≤5.0 mm. When the width is set in the range considering the average size of a human finger, it is possible to more accurately detect a position. Further, the Wa value is preferably 1.5 mm≤Wa≤4.0 mm and more preferably 2.0 mm≤Wa≤2.5 mm. Moreover, the Wb value is preferably 1.5 mm≤Wb≤4.0 mm and more preferably 2.0 mm≤Wb≤3.0 mm.

The thin metal wire 40 constituting the first detection electrode 70 has a line width of 30 μm or less as described above. The thin metal wire 40 constituting the first detection electrode 70 is constituted of a conductive material of a metallic material such as gold, silver, or copper, a metal oxide, and the like.

The first detection electrode 70 includes the plurality of cells 46 constituted by crossing thin metal wires 40. The cell 46 includes an opening region surrounded by the thin metal wire 40. One side of the cell 46 has a length of 250 μm to 900 μm. It is desirable that length of the side is preferably 300 μm to 700 μm.

In the conduction electrode 72 according to the embodiment, from the viewpoint of visible light transmittance, the opening ratio is preferably 85% or more, more preferably 90% or more, and most preferably 95% or more. The opening ratio corresponds to a ratio of a translucent portion with respect to the entire region in a predetermined region with the exception of the thin metal wire 40 of the first detection electrode 70.

As shown in FIG. 8, the second detection electrode 80 is constituted by the plurality of cells 46 formed of the thin metal wires 40. The second detection electrode 80 includes the plurality of conduction electrodes 82 extending in a second direction (Y direction) perpendicular to the first direction (X direction) and arranged to be parallel. Each conduction electrode 82 is electrically separated from the dummy electrode 84.

Each conduction electrode 82 is electrically connected to the second terminal portion 32. Each second terminal portion 32 is electrically connected to the second conductive lead-out wiring 34. Each conduction electrode 82 is electrically connected to the second terminal portion 32 at one end. Each second terminal portion 32 is electrically connected to one end of each second lead-out wiring 34. Each second lead-out wiring 34 is electrically connected to the FPC not shown at the other end. Each conduction electrode 82 has a rectangular shape with a substantially fixed width along the second direction. However, the shape of each conduction electrode 82 is not limited to the rectangular shape.

At the other end of the second detection electrode 80, an additional second terminal portion 33 may be provided. The inspection of each conduction electrode 82 can be easily performed by providing the additional second terminal portion 33.

The thin metal wire 40 constituting the second detection electrode 80 is constituted with substantially the same line width and substantially the same material as the thin metal wire constituting the first detection electrode 70. The second detection electrode 80 includes the plurality of cells 46 constituted by the crossing thin metal wires 40 and has substantially the same shape. The length of one side of the cell 46 and the opening ratio of the cell 46 are also the same.

In FIG. 7, the conduction electrode 72 constituted by the thin metal wire 40 is shown as the first detection electrode 70. In addition to the conduction electrode 72, a dummy wiring portion can be formed in the first detection electrode 70. The dummy wiring portion is constituted by the thin metal wire 40 as in the conduction electrode 72, but is electrically separated from the conduction electrode 72. Regarding the first detection electrode 70 shown in FIG. 7, the dummy wiring portion is formed between adjacent conduction electrodes 72 and in the region of the non-conduction portion 74.

In addition, regarding the second detection electrode 80 shown in FIG. 8, the dummy wiring portion is formed in a region between adjacent conduction electrodes 82. In the conductive film 12B, the first detection electrode 70 having the dummy wiring portion and the second detection electrode 80 having the dummy wiring portion are arranged to face each other. In plan view, the conductive film 12B seems to have superimposed cells. Thus, it is possible to prevent deterioration of the visibility of the conductive film 12B.

The conductive film according to the second embodiment of the present invention is basically constituted as described above.

EXAMPLES

Hereinafter, the present invention will be described in detail based on examples.

Example 1

Figure 9:
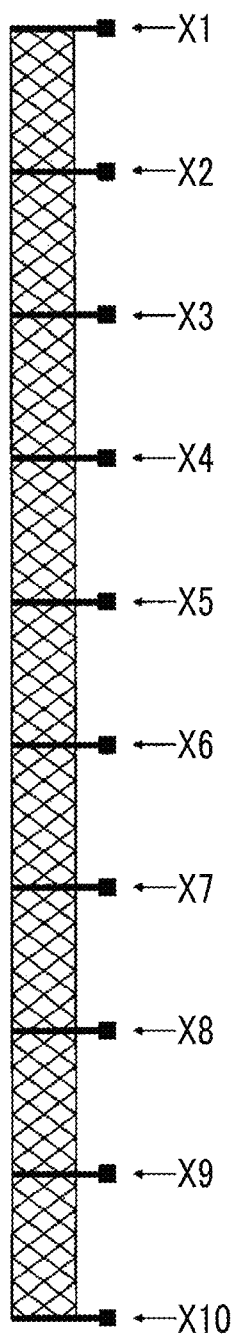
FIG. 9 is a plan view schematically showing a conduction electrode used in an example of the present invention.

For Example 1, as shown in FIG. 9, ten conductive points (terminals) X1 to X10 were provided in a strip-like conduction electrode 90 at equal intervals so as to traverse the conduction electrode, and the conduction electrode 90 were divided into nine regions X1-X2, X2-X3, X3-X4, X4-X5, X5-X6, X6-X7, X7-X8, X8-X9, and X9-X10. The resistances between the points in each of the regions X1-X2 to X9-X10 were measured by a resistance meter. The measured results are shown in Table 1.

In the random electrode pattern of the conduction electrode of Example 1, randomness within ±10% was imparted to the rhombic pitch P of a regular mesh electrode pattern in which the pitch P of the cell 46 of the rhombic mesh was 352 μm, the inclined angle θ of one side of the rhombic cell 46 was 30°, and the amount of protrusion in the conduction electrode 90 of Example 1 was set to 30 μm. In addition, the electrode width of the strip-like conduction electrode 90 was 5 mm.

Examples 2 and 3 and Comparative Examples 1 to 3

For Examples 2 and 3 and Comparative Examples 1 to 3, strip-like conduction electrodes were prepared by changing the amount of protrusion of the strip-like conduction electrode 90 of Example 1 shown in FIG. 9 and as shown in FIG. 9 of Example 1, in the same manner, nine conductive points (terminals) X1 to X10 were provided in each of the prepared conduction electrodes and divided into nine regions X1-X2 to X9-X10. Then, the resistances between the points of each of the regions X1-X2 to X9-X10 were respectively measured by a resistance meter. The measured results are shown in Table 1.

As shown in Table 1, in Examples 2 and 3 and Comparative Examples 1 to 3, the amount of protrusion was respectively set to 40 μm, 50 μm, 0 μm, 20 μm, and 90 μm.

In Table 1, the resistance value (Ω) between the points of each of the regions X1-X2 to X9-X10 of the points X1 to X10 respectively measured in Examples 1 to 3 and Comparative Examples 1 to 3 as described above is shown.

In each example of Examples 1 to 3 and Comparative Examples 1 to 3, differences between the resistance values between the points in each of the regions X1-X2 to X9-X10 and the lowest resistance value among the resistance values were obtained and the proportion of each of the obtained differences with respect to the lowest resistance value (percentage %) was obtained as a resistance variation. The measured results are also shown in Table 1.

The resistance variation of the thus-obtained resistances between points of each of the regions X1-X2 to X9-X10 in each examples of Examples 1 to 3 and Comparative Examples 1 to 3 were evaluated. In the evaluation, a case in which the resistance variation is 20% or less was evaluated as OK, and a case in which the resistance variation is more than 20% was evaluated as NG. The measured results are also shown in Table 1.

TABLE 1

|   | Amount of protrusion | Protrusion/ Mesh size |   | Resistance value (Ω) | Resistance variation (%) | Evaluation |
| --- | --- | --- | --- | --- | --- | --- |
| Comparative example 1 | 0 μm | 0.000% | X1-X2 | 4.97E+04 | 0 | OK |
|  |  |  | X2-X3 | 5.04E+04 | 1.288 | OK |
|  |  |  | X3-X4 | 5.03E+04 | 1.195 | OK |
|  |  |  | X4-X5 | 4.99E+04 | 0.395 | OK |
|  |  |  | X5-X6 | 5.70E+04 | 14.642 | OK |
|  |  |  | X6-X7 | 5.00E+04 | 0.529 | OK |
|  |  |  | X7-X8 | 6.01E+04 | 20.966 | NG |
|  |  |  | X8-X9 | 6.28E+04 | 26.34 | NG |
|  |  |  | X9-10 | 6.99E+04 | 40.604 | NG |
|  |  |  | Total of one column | 5.00E+05 |  |  |
| Comparative example 2 | 20 μm | 5.686% | X1-X2 | 6.75E+04 | 16.004 | OK |
|  |  |  | X2-X3 | 6.00E+04 | 3.18 | OK |
|  |  |  | X3-X4 | 5.91E+04 | 1.689 | OK |
|  |  |  | X4-X5 | 5.82E+04 | 0 | OK |
|  |  |  | X5-X6 | 5.90E+04 | 1.45 | OK |
|  |  |  | X6-X7 | 5.94E+04 | 2.117 | OK |
|  |  |  | X7-X8 | 6.00E+04 | 3.157 | OK |
|  |  |  | X8-X9 | 6.64E+04 | 14.217 | OK |
|  |  |  | X9-10 | 7.26E+04 | 24.787 | NG |
|  |  |  | Total of one column | 5.62E+05 |  |  |
| Example 1 | 30 μm | 8.529% | X1-X2 | 5.89E+04 | 6.398 | OK |
|  |  |  | X2-X3 | 6.04E+04 | 9.18 | OK |
|  |  |  | X3-X4 | 6.14E+04 | 11.008 | OK |
|  |  |  | X4-X5 | 5.92E+04 | 6.983 | OK |
|  |  |  | X5-X6 | 5.71E+04 | 3.264 | OK |
|  |  |  | X6-X7 | 5.71E+04 | 3.319 | OK |
|  |  |  | X7-X8 | 5.68E+04 | 2.675 | OK |
|  |  |  | X8-X9 | 5.53E+04 | 0 | OK |
|  |  |  | X9-10 | 5.53E+04 | 0.038 | OK |
|  |  |  | Total of one column | 5.79E+05 |  |  |

TABLE 1-continued

| | Amount of protrusion | Protrusion/Mesh size | | Resistance value (Ω) | Resistance variation (%) | Evaluation |
|---|---|---|---|---|---|---|
| Example 2 | 40 μm | 11.373% | X1-X2 | 5.50E+04 | 0 | OK |
| | | | X2-X3 | 6.00E+04 | 9.132 | OK |
| | | | X3-X4 | 5.91E+04 | 7.555 | OK |
| | | | X4-X5 | 5.82E+04 | 5.769 | OK |
| | | | X5-X6 | 5.90E+04 | 7.299 | OK |
| | | | X6-X7 | 5.94E+04 | 8.008 | OK |
| | | | X7-X8 | 5.72E+04 | 4.111 | OK |
| | | | X8-X9 | 5.78E+04 | 5.14 | OK |
| | | | X9-10 | 5.60E+04 | 1.847 | OK |
| | | | Total of one column | 5.32E+05 | | |
| Example 3 | 50 μm | 14.216% | X1-X2 | 5.05E+04 | 0 | OK |
| | | | X2-X3 | 5.16E+04 | 2.096 | OK |
| | | | X3-X4 | 5.11E+04 | 1.17 | OK |
| | | | X4-X5 | 5.11E+04 | 1.088 | OK |
| | | | X5-X6 | 5.09E+04 | 0.847 | OK |
| | | | X6-X7 | 5.12E+04 | 1.447 | OK |
| | | | X7-X8 | 5.12E+04 | 1.343 | OK |
| | | | X8-X9 | 5.34E+04 | 5.747 | OK |
| | | | X9-10 | 5.59E+04 | 10.666 | OK |
| | | | Total of one column | 4.67E+05 | | |
| Comparative Example 3 | 90 μm | 25.588% | X1-X2 | 4.87E+04 | 4.522 | OK |
| | | | X2-X3 | 5.32E+04 | 14.161 | OK |
| | | | X3-X4 | 5.87E+04 | 26.056 | NG |
| | | | X4-X5 | 5.33E+04 | 14.442 | OK |
| | | | X5-X6 | 5.90E+04 | 26.782 | NG |
| | | | X6-X7 | 5.94E+04 | 27.622 | NG |
| | | | X7-X8 | 4.66E+04 | 0 | OK |
| | | | X8-X9 | 4.71E+04 | 1.195 | OK |
| | | | X9-10 | 5.24E+04 | 12.585 | OK |
| | | | Total of one column | 4.78E+05 | | |

As seen from the results shown in Table 1, it was found that in Comparative Examples 1, 2, and 3, a region exhibiting a resistance variation of 20% or more (NG) was present, but in Examples 1, 2, and 3, the resistance variation was 11.0% even in the region in which the resistance variation is largest (region X3-X4 in Example 1) and the resistance variation between the regions can be reduced by half.

From the above description, the effects of the present invention become apparent.

Various embodiments and examples of the conductive film according to the present invention and the touch panel sensor provided with the same have been described above, but the present invention is not limited to the above-described embodiments and examples. It is needless to say that various improvements and changes in design can be made within a range not departing from the scope of the present invention.

Explanation of References
- 10: Touch panel sensor
- 12, 12A, 12B: Conductive film
- 14: Controller
- 16: Flexible Printed Circuits (FPC)
- 18: Substrate
- 20, 70: First detection electrode
- 22, 23, 32, 33: Terminal portion
- 24, 34: Lead-out wiring
- 26, 36: Electrode layer
- 28, 38, 56, 66, 76, 84: dummy electrode
- 30, 80: Second detection electrode
- 40: Thin metal wire
- 41, 43, 47: Adhesive layer
- 42, 44: Protective layer
- 46: Cell (opening portion)
- 48: Random electrode pattern
- 50, 60, 72, 82, 90: Conduction electrode
- 52, 62, 64: Edge line
- 54: Disconnection portion
- 58: Intersection
- 59: Crossing position
- 74: Non-conduction portion
- 78: Auxiliary conduction electrode column

What is claimed is:

1. A conductive film comprising:
a transparent electrode layer having a plurality of conduction electrodes extending in one direction,
wherein the conduction electrode is constituted by a plurality of polygonal cells formed of thin metal wires,
the plurality of polygonal cells have a random shape,
the conduction electrode has a preset electrode shape extending in the one direction,
the plurality of polygonal cells have a plurality of first cells formed of the thin metal wires crossing each edge line on both sides of the electrode shape,
the plurality of first cells have a plurality of second cells in which all apexes of the polygonal cells formed by intersections of the thin metal wires constituting one cell are included on an inner side of an extended edge line separated by a fixed distance from the edge line to an outer side and at least one apex of all of the apexes is included between the edge line and the extended edge line adjacent to each other,
a disconnection portion is provided at a position where the thin metal wires constituting the first cells and the second cells and the edge lines cross one another with the exception of the thin metal wires constituting a plurality of third cells in a closed state of which a number proportion is 50% or more of the plurality of second cells, each apex of the plurality of third cells present between the edge line and the extended edge line adjacent to each other is connected to the thin metal wire that extends toward the extended edge line and have a disconnection portion in the middle thereof, is connected to the thin metal wire connected to an apex of another third cell, or is an end point, and in a case in which a diameter of a circle having a smallest size in which the adjacent polygonal cells are included is defined as a mesh size, the fixed distance is a distance of 7% to 20% of the mesh size.

2. The conductive film according to claim 1, further comprising:

a substrate which is a transparent insulator; and a first transparent electrode layer including a first electrode and a second transparent electrode layer including a second electrode which are arranged on the substrate, wherein at least one of the first electrode or the second electrode is the conduction electrode.

3. The conductive film according to claim 2, wherein an electrode width of the first electrode is smaller than an electrode width of the second electrode.

4. The conductive film according to claim 2, wherein the first electrode is the conduction electrode, the second electrode is constituted by a plurality of polygonal cells with a random shape formed of the thin metal wires and has the preset electrode shape extending in a perpendicular direction perpendicular to the one direction, and the thin metal wire constituting the cell on edge lines on both sides of the electrode shape has a disconnection portion at intersections with the edge lines.

5. The conductive film according to claim 3, wherein the first electrode is the conduction electrode, the second electrode is constituted by a plurality of polygonal cells with a random shape formed of the thin metal wires and has the preset electrode shape extending in a perpendicular direction perpendicular to the one direction, and the thin metal wire constituting the cell on edge lines on both sides of the electrode shape has a disconnection portion at intersections with the edge lines.

6. The conductive film according to claim 2, wherein the first electrode is arranged on one side of the substrate, and the second electrode is arranged on the other side of the substrate.

7. The conductive film according to claim 3, wherein the first electrode is arranged on one side of the substrate, and the second electrode is arranged on the other side of the substrate.

8. The conductive film according to claim 4, wherein the first electrode is arranged on one side of the substrate, and the second electrode is arranged on the other side of the substrate.

9. The conductive film according to claim 5, wherein the first electrode is arranged on one side of the substrate, and the second electrode is arranged on the other side of the substrate.

10. The conductive film according to claim 2, wherein the first electrode and the second electrode are respectively formed on both surfaces of the substrate.

11. The conductive film according to claim 3, wherein the first electrode and the second electrode are respectively formed on both surfaces of the substrate.

12. The conductive film according to claim 4, wherein the first electrode and the second electrode are respectively formed on both surfaces of the substrate.

13. The conductive film according to claim 2, further comprising:

a second substrate which is different from the substrate and is a transparent insulator, wherein the first electrode is formed on one surface of the substrate, and the second electrode is formed on one surface of the second substrate and is arranged on the other surface of the substrate.

14. The conductive film according to claim 2, wherein the first electrode and the second electrode are respectively formed on one side of the substrate through an insulating layer.

15. The conductive film according to claim 1, wherein the fixed distance between the edge line and the extended edge line is 20 μm to 120 μm.

16. The conductive film according to claim 1, wherein the transparent electrode layer further has, in addition to the conduction electrode, a dummy electrode which is constituted by the plurality of polygonal cells with a random shape formed of the thin metal wires, has a preset electrode shape extending in the one direction, and is electrically insulated from the conduction electrode by the disconnection portion.

17. The conductive film according to claim 16, wherein the transparent electrode layer alternately includes a plurality of the conduction electrodes and a plurality of the dummy electrodes, the conduction electrode includes at least a non-conduction portion which is electrically separated from conduction electrode therein, and an area A of the conduction electrode and an area B of the non-conduction portion satisfy the following expression, $5\% < (B/(A+B)) \times 100 < 97\%$ 18. The conductive film according to claim 2, wherein the first electrode is arranged to be closer to a viewing side than the second electrode.

19. A touch panel sensor using the conductive film according to claim 1.

20. The touch panel sensor according to claim 19 which is operated using a stylus pen.

* * * * *